United States Patent
Watkins et al.

(10) Patent No.: US 11,126,755 B2
(45) Date of Patent: Sep. 21, 2021

(54) OBJECT SIGNATURES IN OBJECT STORES

(71) Applicant: HEWLETT PACKARD ENTERPRISE DEVELOPMENT LP, Houston, TX (US)

(72) Inventors: Glenn S. Watkins, Westborough, MA (US); John Michael Czerkowicz, Westborough, MA (US); Yan Xiao, Westborough, MA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 704 days.

(21) Appl. No.: 15/884,164

(22) Filed: Jan. 30, 2018

(65) Prior Publication Data
US 2019/0236316 A1    Aug. 1, 2019

(51) Int. Cl.
| | |
|---|---|
| *G06F 11/30* | (2006.01) |
| *G06F 12/14* | (2006.01) |
| *G06F 21/78* | (2013.01) |
| *H04L 9/32* | (2006.01) |
| *G06F 16/14* | (2019.01) |
| *H04L 9/08* | (2006.01) |
| *H04L 29/08* | (2006.01) |
| *H04L 9/06* | (2006.01) |

(52) U.S. Cl.
CPC .......... *G06F 21/78* (2013.01); *G06F 16/152* (2019.01); *H04L 9/0891* (2013.01); *H04L 9/0894* (2013.01); *H04L 9/3236* (2013.01); *H04L 9/3247* (2013.01); *H04L 9/0643* (2013.01); *H04L 67/1095* (2013.01)

(58) Field of Classification Search
CPC ...... G06F 21/78; G06F 21/6227; G06F 21/64; G06F 16/152; G06F 16/2246; H04L 9/3236–3242; H04L 9/3247; H04L 9/0643; H04L 9/0891
See application file for complete search history.

(56) References Cited

U.S. PATENT DOCUMENTS

| | | | |
|---|---|---|---|
| 4,989,134 A | * | 1/1991 | Shaw ................. G06F 12/0269 |
| 7,103,595 B2 | | 9/2006 | Anastasiadis et al. |
| 7,139,781 B2 | | 11/2006 | Young et al. |

(Continued)

OTHER PUBLICATIONS

Georg Becker, "Merkle Signature Schemes, Merkle Trees and Their Cryptanalysis", Jul. 18, 2008, pp. 1-28, Ruhr-Universitat Bochum. https://www.emsec.rub.de/media/crypto/attachments/files/2011/04/becker_1.pdf.

(Continued)

*Primary Examiner* — Trong H Nguyen
(74) *Attorney, Agent, or Firm* — Hewlett Packard Enterprise Patent Department

(57) ABSTRACT

In an example, a system may include an object store for storing objects, wherein each object is identified by an object signature generated according to a first cryptographic function, wherein the objects stored in the object store exhibit a hierarchical relationship from a root object. The system may receive a second cryptographic function for the object store, receive an I/O request affecting an object in the object store, encode the affected object according to the second cryptographic function, and persist the affected object alongside other objects in the object store encoded according to the first cryptographic function.

19 Claims, 6 Drawing Sheets

(56) References Cited

U.S. PATENT DOCUMENTS

| | | | |
|---|---|---|---|
| 7,315,866 | B2 | 1/2008 | Wu et al. |
| 7,454,592 | B1 | 11/2008 | Shah et al. |
| 7,747,663 | B2 | 6/2010 | Atkin et al. |
| 7,814,078 | B1 | 10/2010 | Forman et al. |
| 8,028,106 | B2 | 9/2011 | Bondurant et al. |
| 8,140,625 | B2 | 3/2012 | Dubnicki et al. |
| 8,140,786 | B2 | 3/2012 | Bunte et al. |
| 8,224,935 | B1* | 7/2012 | Bandopadhyay ..... G06F 9/5072 709/221 |
| 8,296,312 | B1 | 10/2012 | Leung et al. |
| 8,397,074 | B2 | 3/2013 | Hett et al. |
| 8,478,799 | B2 | 7/2013 | Beaverson et al. |
| 8,949,997 | B2 | 2/2015 | Schmidt et al. |
| 9,952,933 | B1 | 4/2018 | Zhang et al. |
| 10,042,558 | B1 | 8/2018 | Visvanathan et al. |
| 10,303,390 | B1* | 5/2019 | Colgrove ............. G06F 3/0625 |
| 2004/0148306 | A1 | 7/2004 | Moulton et al. |
| 2006/0036898 | A1 | 2/2006 | Doering |
| 2007/0101127 | A1 | 5/2007 | Butler et al. |
| 2008/0028224 | A1 | 1/2008 | Pitsos |
| 2008/0181403 | A1* | 7/2008 | Sakamoto ............. H04L 9/3236 380/258 |
| 2009/0240717 | A1* | 9/2009 | Mimatsu ............. G06F 11/0727 |
| 2010/0198783 | A1* | 8/2010 | Wang .................. H04L 67/1095 707/610 |
| 2010/0257149 | A1* | 10/2010 | Cognigni ................ G06F 16/27 707/698 |
| 2013/0227209 | A1 | 8/2013 | Czerkowicz et al. |
| 2015/0161154 | A1* | 6/2015 | Gheith .................... G06F 3/061 707/705 |
| 2016/0202927 | A1 | 7/2016 | Klarakis et al. |
| 2017/0161522 | A1* | 6/2017 | Anderson ............. H04L 9/3242 |

OTHER PUBLICATIONS

"AMD Athlon Processor", ADM Technical Brief, Publication # 22054, Rev. D, Issue date Dec. 1999, 10 pages.
McKusick et al., "A fast file system for UNIX", ACM Transactions on Computer Systems (TOCS), vol. 2, 1984, 14 pages.
Martin Placek, "Storage Exchange: A Global Platform for Trading Distributed Storage Services," Master of Engineering Science Thesis, The University of Melbourne, Australia, Jul. 2006, 185 pages.
Marice J. Bach, The Design of the UNIX Operating System (1986), 8 pages.
Li, et al., "Secure Untrusted Data Repository (SUNDR)", USENIX Association OSDI '04: 6th Symposium on Operating Systems Design and Implementation, Dec. 6-8, 2004, pp. 121-136, (Springpath Exhibits 1003 & 1103).
Levanoni et al, "An On-the-Fly Reference-Counting Garbage Collector for Java", ACM Transactions on Programming Languages and Systems (TOPLAS), vol. 28, 2006, 67 pages.
Kawaguchi et al., "A Flash-Memory Based File System", Proceeding TCON'95 Proceedings of the USENIX 1995 Technical Conference Proceedings, 1995, 10 pages.
Josh Cates, "Robust and Efficient Data Management for a Distributed Hash Table", Jun. 2003, 64 pages.
Joint Claim Construction and Prehearing Statement, Case 4:15-cv-13345-TSH, Document 136, Aug. 7, 2017, pp. 1-8.
Ingrid Hsieh-Yee, "Declaration of Ingrid Hsieh-Yee, PhD, Under 37 C.F.R .sctn. 1.68 in Support of Petition for Inter Partes Review of U.S. Pat. No. 8,478,799", dated Aug. 10, 2017, 77 pages.
IEEE The Open Group, "1003.1 (Trademark) Standard for Information Technology—Portable Operating System Interface (POSIX (R))", Base Specification, Issue 6, IEEE Std 1003.1-2001, Approved Sep. 12, 2001, The Open Group, (Springpath Exhibits 1015 & 1115), 8 pages.
IBM, AIX 5L Version 5.2, "General Programming Concepts: Writing and Debugging Programs", 9th Edition, Aug. 2004, 616 pages.
Hutchinson et al, "Logical vs. Physical File System Backup", Proceedings of the 3rd Symposium on Operating Systems Design and Implementation, New Orleans, Louisiana, Feb. 1999, 12 pages.
Hitz et al., "File System Design for an NFS File Server Appliance", Technical Report 3002, USENIX Winter 1994—San Francisco, California, Jan. 19, 1994, 23 pages.
Hewlett Packard Enterprise Company's Response to Springpath's Supplemental Claim Construction Brief, C.A. No. 4:15-cv-13345-TSH, Oct. 30, 2017, pp. 1-5.
Harel Paz, "Efficient Memory Management for Servers", Research Thesis Submitted to the Senate of the Technion—Israel Institute of Technology, Aug. 2006, 228 pages.
Grembowski et al., "Comparative Analysis of the Hardware Implementations of Hash Functions SHA-1 and SHA-512", Information Security. ISC 2002, Lecture Notes in Computer Science, vol. 2433, 2002, 15 pages.
GitHub, "SHA1collisiondetection", Retrieved from <https://web.archive.org/web/20170223163138/https://github.com/cr-marcstevens/sha1collisiondetection>, Feb. 23, 2017, 2 pages.
Garth Gibson, et al., "A Cost-Effective, High-Bandwidth Storage Architecture," Proceedings of the 8th Conference on Architectural Support for Programming Languages and Operating Systems, 1998, pp. 92-103.
Fu et al., Fast and Secure Distributed Read-Only File System, ACM Transactions on Computer Systems, vol. 20, No. 1, Feb. 2002, pp. 1-24.
Fu et al., "Fast and Secure Distributed Read-Only File System", Proceeding OSDI'00 Proceedings of the 4th conference on Symposium on Operating System Design & Implementation, vol. 4, 2000, 16 pages.
Frequently Asked Questions for FreeBSD 2.X, 3.X and 4.X-, unknown date, 8 pages,. ,Achived at https://web.archive.org/web/20020404064240/http://www.freebsd.org:80/doc/en_US.ISO8859-1/books/faq/install.html.
Frank Dabek, "A Distributed Hash Table," Sep. 2005, pp. 1-135, Massachusetts Institute of Technology.
Defendant Springpath, Inc.'s Repiy Claim Construction Brief, Case 4:15-cv-13345-TSH, Document 133, Jul. 24, 2017, pp. 1-17.
Defendant Springpath, Inc.'s Preliminary Claim Construction Brief with Exhibits, Case 4:15-cv-13345-TSH, Document 129, Jul. 10, 2017, pp. 1-138.
Defendant Springpath, Inc.'s Motion for Leave to File Supplemental Claim Construction Brief, Case 4:15-cv-13345-TSH, Document 146, Oct. 17, 2017, pp. 1-5.
Declaration of Darrell D.E.Long, Ph.D. Regarding U.S. Pat. No. 8,478,799 dated Sep. 14, 2016, Case IPR2016-01780 (Springpalh Exhibit 1102), 114 pages.
Declaration of Darrell D.E.Long, Ph.D. Regarding U.S. Pat. No. 8,478,799 dated Sep. 14, 2016, Case IPR2016-01779 (Springpath Exhibit 1002), 109 pages.
Decision Denying Institution of Inter Partes Review, Case IPR2017-01933, U.S. Pat. No. 8,478,799 B2, Mar. 16, 2018, pp. 1-18, USPTO.
Debnath et al., "ChunkStash: Speeding up Inline Storage Deduplication using Flash Memory" 2010 USENIX Annual Technical Conference (ATC), 2010, 16 pages.
David Bader, "Declaration of David Bader, Under 37 C.F.R. .sctn. 1.68", dated Aug. 10, 2017, 31 pages.
Dang, Quynh, "Recommendation for Applications Using Approved Hash Algorithms", Computer Security Division, Information Technology Laboratory, NIST Special Publication 800-107, Revision 1, Aug. 2012, pp. 1-22.
Dabek et al., "Wide-area cooperative storage with CFS," Operating Systems Review—Proceedings of the 18th ACM Symposium on Operating Systems Principles (SOSP'01), vol. 35, No. 5, 2001, pp. 202-215.
Cox et al., "Pastiche: Making Backup Cheap and Easy", ACM SIGOPS Operating Systems Review—OSDI '02: Proceedings of the 5th Symposium on Operating Systems Design and Implementation, vol. 36, 2002, 14 pages.
Chaves et al., "Cost-Efficient SHA Hardware Accelerators", IEEE Transactions on Very Large Scale Integration (VLSI) Systems, vol. 16, No. 8, Aug. 2008, pp. 999-1008.
Byung-Gon Chun, et al., "Efficient Replica Maintenance for Distributed Storage Systems," USENIX Association, Proceedings of

(56) References Cited

OTHER PUBLICATIONS

NSDI '06: 3rd Symposium on Networked Systems Design & Implementation, 2006, pp. 45-58.

Bruce Schneier, "Applied Cryptography, 2d Ed, Protocol, Algorithms, and Source Code in C", John Wiley & Sons, Inc., 1996, 4 pages.

Bruce Eckel, "C++ Inside & Out", 1992, 6 pages.

Boehm et al., "Garbage Collection in an Uncooperative Environment", Software—Practice & Experience, vol. 18, Sep. 1988, 17 pages.

Bobbarjung et al., "Improving Duplicate Elimination in Storage Systems", ACM Transactions on Storage, vol. 2, 2006, 23 pages.

Bibliographic Record Information, "The Design and Implementation of the FreeBSD Operating System", 2005, available at the online catalog of the Library of Congress, accessed Aug. 3, 2017, 2 pages.

Bibliographic Record Information for Operating Systems Review—Proceedings of the 18th ACM Symposium on Operating Systems Principles (SOSP'01), 2001, available at the online catalog of the Library of Congress, accessed Jul. 31, 2017, 3 pages.

Best, et al., "How the Journaled File System handles the on-disk layout", May 2000, IBM: developerWorks: Linux library/Open source library Internet download Apr. 18, 2001; http://swgiwas001.sby.ibm.com/developerworks/library/jfslayout/Index1.html (Springpath Exhibits 1011 & 1111), 30 pages.

Athicha Muthitacharoen, et al., "Ivy: A Read/Write Peer-to-Peer File System" Proceedings of the 5th Symposium on Operating Systems Desing and Implementation (OSDI '02), Operating Systems Review, vol. 36, Issue SI (Winter 2002), 21 pages.

Andrew S. Tanenbaum, "Modern Operating Systems", 2d Ed., 2001, 7 pages.

AMD Athlon (Trademark), "Processor Quick Reference FAQ", Feb. 3, 2000, 12 pages.

Alan Freedman, "Computer Desktop Encyclopedia", 9th Ed., Osborne/McGraw-Hill, 2001, 7 pages.

AIX 5L Version 5.2 System Management Concepts: Operating System and Devices, May 2004, 7th ed., IBM, pp. 1-190.

Abd-El-Malek et al., Ursa Minor: Versatile Cluster-Based Storage, Proceeding FAST'05 Proceedings of the 4th conference on USENIX Conference on File and Storage Technologies, vol. 4, 2005, 14 pages.

"Curriculum Vitae of Dr. Prashant Shenoy", 2017, 31 pages.

"Bibliographic Record Information for Operating Systems Review"—Proceedings of the Fifth ACM Symposium on Operating Systems Design and Implementation (OSDI'02), Dec. 9-11, 2002, available at the WRLC online catalog, accessed Jul. 20, 2017, 2 pages.

Zhu et al., "Avoiding the Disk Bottleneck in the Data Domain Deduplication File System", Proceeding FAST'08 Proceedings of the 6th USENIX Conference on File and Storage Technologies, Article No. 18, 2008, 14 pages.

You et al., "Deep Store: An Archival Storage System Architecture", 21st International Conference on Data Engineering (ICDE'05), 2005, 12 pages.

Xie, et al., "Oasis: An active storage framework for object storage platform", Future Generation Computer Systems, vol. 56, Mar. 2016, 14 pages, SimpliVity Exhibit 2007, *Springpath* v. *SimpliVity* IPR2016-01779.

Wikipedia: "Object Storage" (available at https://en.wikipedia.org/wiki/Object.sub.--storage) (last visited Dec. 6, 2016), SimpliVity Exhibit 2001, *Springpath* V. *SimpliVity* IPR2016-01779, 9 pages.

Wikipedia: "Namespace" (available at https://en.wikipedia.org/wiki/Namespace) (last visited Dec. 6, 2016), SimpliVity Exhibit 2008, *Springpath* V. *SimpliVity* IPR2016-01779, 3 pages.

Webster's New World Computer Dictionary, 10th Ed. 2003, 3 pages.

Webopedia: "Namespace" (available at http://www.webopedia.com/TERM/N/namespace.html) (last visited Dec. 20, 2016), SimpliVity Exhibit 2009, *Springpath* v. *SimpliVity* IPR2016-01779, 2 pages.

Webopedia: "Inode" (available at http://www.webopedia.com/TERM/I/inode.html) (last visited Dec. 20, 2016), SimpliVity Exhibit 2002, *Springpath* V. *SimpliVity* IPR2016-01779, 2 pages.

USPTO PTAB Patent Owner's Preliminary Response dated Dec. 27, 2016, *Springpath, Inc.* v. *SimpliVity Corp.*, Case IPR2016-01780, U.S. Pat. No. 8,478,799 B2 (SimpliVity Exhibits 2001-2009 identical to IPR2016-01779 and previously submitted), 48 pages.

USPTO PTAB Patent Owner's Preliminary Response dated Dec. 27, 2016, *Springpath, Inc.* v. *SimpliVity Corp.*, Case IPR2016-01779, U.S. Pat. No. 8,478,799 B2 (SimpliVity Exhibits 2001-2009 listed below), 44 pages.

USPTO PTAB Decision Denying Institution of Inter Partes Review entered Mar. 22, 2017, *Springpath, Inc.* v. *SimpliVity Corp.*, Case IPR2016-01779, U.S. Pat. No. 8,478,799 B2, 15 pages.

USPTO PTAB Decision Denying Institution of Inter Partes Review entered Mar. 21, 2017, *Springpath, Inc.* v. *SimpliVity Corp.*, Case IPR2016-01780, U.S. Pat. No. 8,478,799 B2, 15 pages.

USENIX Association, "Proceedings of the First Symposium on Networked Systems Design and Implementation," Mar. 2004, pp. 1-15, San Francisco, CA, USA.

US Patent and Trademark Office Notice of Allowance dated May 29, 2013 in U.S. Appl. No. 12/823,922 (Springpalh Exhibits 1013 & 1113), 12 pages.

US Patent and Trademark Office non-final Office Action dated Aug. 30, 2012 in U.S. Appl. No. 12/823,922 (Springpath Exhibits 1006 & 1106), 32 pages.

US Patent and Trademark Office final Office Action dated Feb. 22, 2013 in U.S. Appl. No. 12/823,922 (Springpath Exhibits 1010 & 1110), 26 pages.

Understanding Object Storage and Block Storage use cases, Jul. 20, 2015 (available at http://cloudacademy.com/blog/object-storage-block-storage/) (last visited Dec. 22, 2016), SimpliVity Exhibit 2005, *Springpath* v. *SimpliVity* IPR2016-01779, 9 pages.

U.S. Provisional App. Filed on Jun. 26, 2009, 32 pages., U.S. Appl. No. 61/269,633.

The EMC Centera and Tower Technology Advantage, EMC White Paper, Jul. 2002, pp. 1-8.

Stevens. et al., "The first collision for full SHA-1," International Association for Cryptology Research 2017, pp. 570-596.

Springpath Inc.'s Preliminary Invalidity Contentions, C.A. No. 4:15-cv-13345-TSH Document 101, filed Mar. 21, 2017 in the US Disctrict Court for the District of Massachusetts and Exhibit A1.

Simplivity Corporation's Reply Claim Construction Brief, Case 4:15-cv-13345-TSH, Document 132, Jul. 24, 2017, pp. 1-23.

Simplivity Corporation's Opening Claim Construction Brief, Case 4:15-cv-13345-TSH, Document 130, Jul. 10, 2017, pp. 1-21.

SimpliVity Corporation's Markman Hearing Transcript, Case No. 15cv13345-TSH, Aug. 16, 2017, pp. 1-119.

Sang-Won Lee, et al., "A Case for Flash Memory SSD in Enterprise Database Applications," Proceedings of the 2008 ACM SIGMOD International Conference on Management of Data (2008), pp. 1075-1086.

Sandberg et al. "Design and Implementation of the Sun Network Filesystem", Sun Microsystems, Mountain View, CA (12 pp) (Springpath Exhibits 1004 & 1116) Dec. 27, 2016.

Ritchie et al., "The UNIX Time-Sharing System", Communications of the ACM, vol. 17, Jul. 1974, pp. 365-375.

Rhea et al., Fast, "Inexpensive Content-Addressed Storage in Foundation", Proceeding of USENIX 2008 Annual Technical Conference, 2008, 14 pages.

Response to U.S. non-final Office Action dated Aug. 30, 2012 filed Dec. 18, 2012 in U.S. Appl. No. 12/823,922 (Springpath Exhibits 1009 & 1109), 148 pages.

Response to U.S. final Office Action dated Feb. 22, 2013 filed May 8, 2013 in U.S. Appl. No. 12/823,922 (Springpath Exhibits 1012 & 1112), 48 pages.

Ragib Hasan, et al., "A Survey of Peer-to-Peer Storage Techniques for Distributed File Systems," International Conference on Information Technology: Coding and Computing, 2005, 9 pages.

R. Rivest, "The MD5 Message-Digest Algonthm," Request for Comments 1321, Internet Engineering Task Force, CSCO-1017, Apr. 1992, 21 pages.

Quinlan et al., "Venti: a new approach to archival storage", Bell Labs, Lucent Technologies, 1-13 pp (Springpath Exhibits 1008 & 1108).

(56) References Cited

OTHER PUBLICATIONS

Prosecution History of the U.S. Pat. No. 8,478,799 patent, 576 pages.
Presentation: "Object Storage technology," Storage Networking Industry Association, 2013 (available at http://www.snia.org/sites/defaull/education/tutorials/2013/spring/file/BrentWelch_Object_Storage_Technology.pdf) (last visited Dec. 22, 2016), SimpliVity Exhibit 2003, *Springpath* v. *SimpliVity* IPR2016-01779, 42 pages.
Preliminary information, AMD Athlon, Processor Module Data Sheet, AMD .Athlon, Publication #21016, Rev. M, Issue Date: Jun. 2000, 74 pages.
Prashant Shenoy, et al., "Symphony: An Integrated Multimedia File System," Proceedings of SPIE 3310, Multimedia Computing and Networking 1998, pp. 124-138.
Prashant Shenoy, "Declaration of Prashant Shenoy. PhD, Under 37 C.F.R. .stcn. 1.68 in Support of Petition for Inter Partes Review of U.S. Pat. No. 8,478,799", dated Aug. 11, 2017, 196 pages.
Petitioner's Reply to Patent Owner's Preliminary Response, Case IPR2017-01933, U.S. Pat. No. 8,478,799, Feb. 28, 2018, pp. 1-17.
Petition for Inter Partes Review of U.S. Pat. No. 8,478,799 before the USPTO Patent Trial and Appeal Board dated Sep. 14, 2016, Case IPR2016-01780, 66 pages.
Petition for Inter Partes Review of U.S. Pat. No. 8,478,799 before the USPTO Patent Trial and Appeal Board dated Sep. 14, 2016, Case IPR2016-01779, 59 pages.
Petition for Inter Partes Review of U.S. Pat. No. 8,478,799 filed Aug. 11, 2017, case IPR2017-01933, 92 pages. The citations from PIR2017-01933 are submitted herewith below.
Patent Owner's Preliminary Response Pursuant to 37 CFR 42.107(a), Case IPR2017-01933, U.S. Pat. No. 8,478,799, Dec. 21, 2017, pp. 1-47.
Object Storage versus Block Storage: Understanding the Technology Differences, Aug. 14, 2014 (available at http://www.druva.com/blog/object-storage-versus-block-storage-understandi-ng-technology-differences/) (last visited Dec. 22, 2016), SimpliVity Exhibit 2004, *Springpath* v. *SimpliVity* IPR2016-01779, 7 pages.
OBFS: A File System for Object-based Storage Devices, Feng, et al., 2004, SimpliVity Exhibit 2006, *Springpath* v. *SimpliVity* IPR2016-01779, 18 pages.
Nitin Agrawal, et al., "Design Tradeoffs for SSD Performance," USENIX'08: 2008 USENIX Annual Technical Conference, Jun. 25, 2008, pp. 57-70.
Microsoft Computer Dictionary, 5th Ed., 2002, 7 pages.
Michele Nelson, "Declaration of Michele Nelson, Under 37 C.F.R .sctn. 1.68", dated Aug. 9, 2017, 92 pages.
Mesnier et al., "Object-Based Storage", IEEE Communications Magazine, vol. 41, Aug. 2003, pp. 84-90.
Mendel Rosenblum, "The Design and Implementation of a Log Logstructuredfile System", Kluwer Academic Publishers, 1995, 3 pages.

\* cited by examiner

OBJECT SIGNATURES IN OBJECT STORES

BACKGROUND

File systems are used to control how data is stored and retrieved. The file system allows differentiation of information placed in a medium. One method of differentiating the information on a medium is to separate the data into pieces and to give each piece a name. There are different kinds of file systems having different structures, logic, properties of speed, flexibility, security, size and the like. File systems may be implemented on one or more nodes of a federated system of nodes.

Federated systems are a collection of nodes. In an example, the nodes may act in a peer-to-peer network without a centralized authority. In a decentralized network, peers communicate among themselves to resolve state. The nodes in the federated system may communicate with each other regarding the underlying state including the state of the file system.

BRIEF DESCRIPTION OF DRAWINGS

Examples are described in detail in the following description with reference to the following figures. In the accompanying figures, like reference numerals indicate similar elements.

DETAILED DESCRIPTION OF EMBODIMENTS

Figure 1:
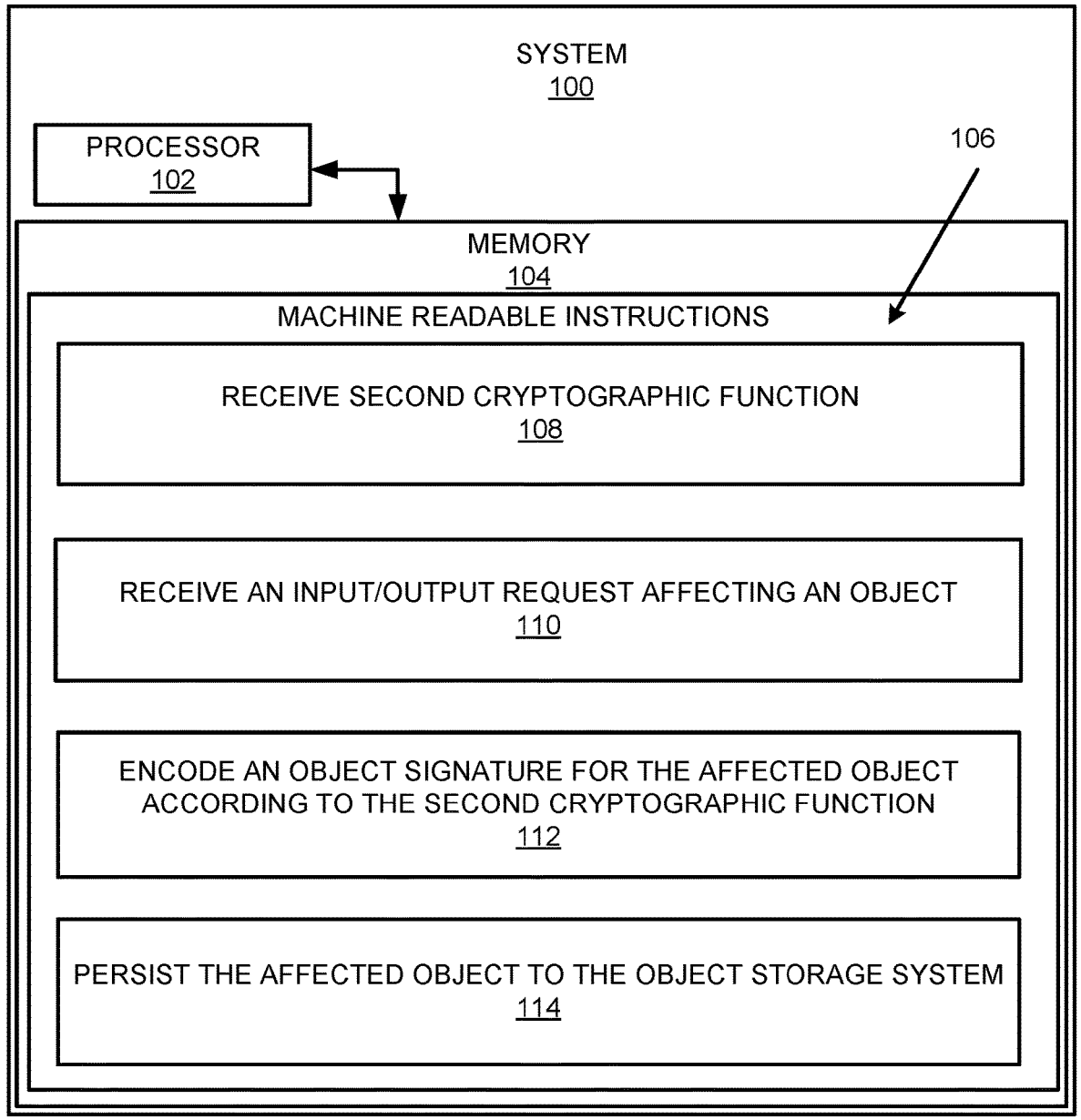
FIG. 1 illustrates an example of a system for migrating a cryptographic function.

For simplicity and illustrative purposes, the principles of the embodiments are described by referring mainly to examples thereof. In the following description, numerous specific details are set forth in order to provide an understanding of the embodiments. It will be apparent, however, to one of ordinary skill in the art, that the embodiments may be practiced without limitation to these specific details. In some instances, well-known methods and/or structures have not been described in detail so as not to unnecessarily obscure the description of the embodiments.

According to an example of the present disclosure, a system may transition an object store from a first cryptographic function to a second cryptographic function, where object signatures in the object store are unique, object signatures generated using the first cryptographic function and the second cryptographic function coexist. The objects encoded using the first cryptographic function may still be identified and retrieved after the transition from the first cryptographic function to the second cryptographic function, until the objects are deallocated or modified. In an example, the system may retain the object encrypted according to the first cryptographic function alongside a modified object according the second cryptographic function.

In an example, the system may encode the contents of an object using a cryptographic function such as the first cryptographic function or second cryptographic function to determine the object signature unique to that object. A change in the contents of the object may change the object signature of that object. In an example, the object store may use a cryptographic digest or an object signature for an object to identify the object in the object store, wherein each object in the object store exhibits a hierarchical relationship from the root object ending in child objects located furthest from the root object. In an example, the system may include a child object signature in the contents of the parent object of the child object. The grandparent object of the child object and parent of the parent object may include an object signature of the parent object, and so on until the root object. In another example, the grandparent object may include the child object signature and the parent object signature, and so on until the root object. The root object in this example may include the object signature of all objects in the object store. Thus, the system may implement the second cryptographic function without re-encoding the first object in the object store.

In an example, the object store may store both the first object and the second object alongside each other. Also, the system may allow access to the first object from an object store storing the first object and the second object with object signatures generated according to different cryptographic functions coexist in the object store. In an example, one or more objects in the object store may exhibit a relationship described by a directed acyclic graph (DAG). For example, a DAG may include objects that exhibit a hierarchal relationship from the root object to the child object. The DAG may include many vertices (objects) and edges (pointers to objects), with each edge directed from one vertex to another such that there is no way to start at any random vertex and follow a consistently directed sequence of edges that eventually loops back to the random vertex again. Also, the DAG may include a topological ordering, a sequence of vertices such that every edge is directed from an earlier vertex to later vertex in the sequence. In an example, the DAG may be a blockchain storage. The blocks in the blockchain may be the vertices, and the edges may be pointers to other objects. In an example, an edge may point to the last block of the blockchain or may be abandoned objects in the blockchain such as forks. In an example, the DAG may include a root object that includes the signature of a child object, the child object in turn including the signature of its child object and so on ending in a leaf object (an object with no child object). The objects may thus have a hierarchical structure where the topological ordering is directed from the root object to the farthest child object in the sequence. Examples of DAG's may include blockchains or trees. In an example, an object store may store one or more objects that are related to each other in the form of a Merkle tree or a modified Merkle tree with the root object at the top and child objects below the root object ending in a leaf node farthest away from the root object forming a hierarchical relationship from the root object. In an example, an object store may store one or more objects that are related to each other in the form of a DAG or any other hierarchical structures for storing data with an object signature used to identify each object in the object store. In another example, the object store on each node may include objects that form one or more DAG's. For example, a node may store a DAG to back up the current state of an object, and store changes as a new DAG to switch between the current state and the previous state of the object store.

According to an example of the present disclosure, a system may generate a parent object of the second object by including the signature of the second object in the contents of the parent object. In an example, assume a second object is a new object that was previously not stored in the object store. The system may generate a parent object of the second object by including the second object signature in the contents of the parent object. In another example, when the first object is changed the system may replace the object the object signature of the first object with a new object signature of the modified object, store the modified second object in the object store, where a first object signature was previously generated using a first cryptographic function and the first object was stored in the object store. In another example, when the first object is changed the system may store the modified first object alongside the first object in the object storages system. The first object may be encoded according to the first object signature and the second object may be encoded according to the second object signature.

In an example, when the first object is still used by other parent objects, the system may store the first object and then generate a modified first object and update the content of a parent object. For example, two parent objects may include the object signature of a child object. The child object may be modified by a first virtual machine, while the child object remains unmodified with respect to a second virtual machine. The system may store both the modified object and the first object. The system may update one parent with the object signature of the modified object while retaining the object signature of the other parent object. Each object signature in the object store is globally unique, meaning that the identifier is unique across all the nodes in the object store. In an example, unique may mean the probability of collision between object signatures is astronomically small. For example, using an ideal cryptographic function with the output size of n, where there are p objects then the possibility of collision is $p^2/2^{n+1}$ provided p is smaller than $2^{n/2}$. For example, with SHA-256 (n=256) and one billion objects ($p=10^9$) the probability of collision is $4.3 \times 10^{-60}$.

An object may be a block of data of a known size, which may be uniquely identified by the object signature. In an example, the object signature may be generated according to a first cryptographic function of the data of the object. In an example, the object signature encoded according to the first cryptographic function may include a cryptographic digest of an object, the size of the object and the type of the object. In an example, the object signature encoded according to the second cryptographic function may include a cryptographic digest of an object, the cryptographic function used for encoding, the size of the object and the type of the object. In an example, the system may assume the object signature, which does not include the cryptographic function used for encoding was encoded according to the first cryptographic function. For example, a cryptographic function may be an SHA-256 cryptographic function. In an example, the object may store data or metadata. Examples of types of objects may include data objects and metadata objects. In another example, an object may store both data and the metadata. Metadata may be described as data about an object. In an example, a metadata object or hnode object may contain the object signatures of the child objects in an object store. Metadata may be information about other objects. Data objects may be objects that contain opaque user data.

In an example, the objects in the object store may be stored on persistent storage. Examples of persistent storage may include the Solid State Drive, Non-Volatile Storage, Flash storage, Optane™ and the like. The object store may include an object index. The object index may map the physical location on the persistent storage where the object data is stored. The object index may comprise of individual object records. Each object record may associate an object signature with a reference count and the physical location where the associated data is stored. In an example, the object record may include the signature of the object, reference count of the object and the location where the object is stored. For example, one or more virtual machines may send a request to the object store to store one or more objects multiple times. The object store may receive the I/O request and instead of storing the same object multiple times, store the object once and increment the reference count of the object record of the object. When an instance or copy of the object is deleted, the reference count in the object recorded may be decremented instead of deleting the object. The object may be permanently deallocated when the reference count hits zero. For example, the operating systems and programs installed on virtual machine instances may be stored once in an object on the object store using reference counts instead of storing multiple copies. In an example, the object stores may be stored on a local network node or a remote network node. In an example, with reference to the local network node, a node in the plurality of network nodes may be called a remote network node. The object store on the remote network node may be described as the remote object store. The object store on the local network node may be described as the local object store. The local object store and the remote object store may store objects with a unique object signature generated using a cryptographic function (e.g., by hashing the contents of the objects using a cryptographic function). Also, a node may have one or more object stores. In an example, an object store may be a virtual layer and may store objects on persistent storage. The object store may be implemented on a federated peer-to-peer network of a plurality of nodes. One or more nodes in the plurality of nodes may include the object store. The object store on each of the nodes may store objects according to a policy. For example, a node may be configured as a backup node and may replicate objects stored on another node.

Also, in an example, objects in the object store may exhibit a hierarchical relationship to a root object. Any object in the object store may be accessed via the root object. The object signature allows storing an object once in a persistent storage, i.e., avoiding duplicates, using an object store that maps object signatures to object data through access to an object index and the persistent media where the data is stored. In examples, the system may store an object once to avoid duplication. The system may avoid duplication of the object globally across the nodes of the object store. However, the system may store the same object more than once for redundancy, backup and/or faster access to other nodes such as a remote network node or backup node colocated next to a node. For example, the object store may replicate objects at a remote site periodically for disaster recovery. However, the object signature reduces data storage through deduplication. For example, virtual machines may run instances of operating systems, and the virtual machines may be stored on the nodes. The common components of the operating systems may be stored once in one or more objects in a node. Running multiple virtual machine instances may save space by reusing the objects on the node.

Also, the objects stored on a local network node may be replicated for redundancy, backup and/or faster access on other nodes. Since the object signature of each object is unique, an object may be identified irrespective of the storage location. A duplicate storage request may be identified by generating an object signature of the object to be stored using the cryptographic function. Since the object signature is based on the content of the object, a duplicate object may be identified irrespective of the storage location. Also, the object signature is smaller than the size of the object. For example, the object signature may be $\frac{1}{100}$ or $\frac{1}{1000}$ the size of the object. The smaller object signature may be manipulated faster when compared with manipulating the object directly. For example, replicating a hive of objects for redundancy may involve copying the object signatures of the hive of objects to a remote location, associating the object signatures to objects in the local object storage and copying any missing objects from another node. In an example, a hive may be a set of objects that belong to a virtual machine. In an example, the objects in the set of objects may be related to each other in the form of a DAG.

In an example, an object store may be useful in a file storage system. In an example, the inode may be a data structure in a file system that stores all the information about a file except its name and its actual data. The signature of the root metadata object may be referred to as root object signature. In an example, the persistent storage inodes may be mapped to file and or directory content via an inode hnode. The inode hnode may also be described as a metadata object. In an example, the metadata object may point to either a file or a directory. In an example, the metadata object may contain the signature of a data object containing attributes, a signature of a data object containing extended attributes and/or a signature of the inode root hnode. In an example, the leaf nodes of a DAG (e.g., a tree) with the hnode root object may contain the data of the file or the directory associated with the inode. In an example, the top N levels of the file system from the root object may be described as an imap tree. In an example, the imap tree may provide a mapping of inode numbers to inode hnode signatures by indexing the object signatures stored in leaf nodes of the imap tree.

According to an example of the present disclosure, the system may implement a second cryptographic function to encode object signatures for objects stored in an object store that were previously encoded according a first cryptographic function, while allowing access to objects encoded according to the first cryptographic function and/or objects encoded according to the second cryptographic function. This use of a second cryptographic function is referred to herein as the migration of a cryptographic function in an object store. A technical problem with migration of a cryptographic function for an object store is an increase in the system resource utilization such as memory, processing, and storage. Another technical problem associated with the cryptographic function migration is access to files identified using the first cryptographic function concurrently with files identified using the second cryptographic function. In an example, the system as described below allows migration of an object store incrementally. Also, in an example, the incremental migration in federated nodes may be synchronized. In an example, the federated nodes may be connected to each other to form a peer-to-peer network of nodes, where the nodes communicate with each other to update the state of system. The system as described below allows access to objects identified using an object signature generated using the first cryptographic function along with objects identified using the second cryptographic function.

FIG. 1 shows an example of a system 100, referred to as system 100. The system 100 may include a processor 102 and a memory 104. The system 100 may include machine readable instructions 106 stored in the memory 104 or another type of non-transitory computer readable medium. In an example, the system 100 may include a node, wherein the node has a persistent storage accessible through an object index and a local object store. In another example, the system 100 may include network nodes, wherein one or more nodes has an object store. The object store may manage and store objects on a persistent storage. The object store on the local network node may be termed as local object store and may include an object index with a root object. Each node may be implemented on servers, specialized hardware, a hybrid of servers and/or specialized hardware. The persistent storage media on a node may store objects of the object store. The system 100 may store objects on the local network node or remote network node. In an example, the system 100 may store objects on the local network node's object store or remote network node's object store. In an example, the object store may be based on a globally unique object signature generated using a cryptographic function. For example, creating a new object creates an object signature for the new object using a cryptographic function. Modifying an existing object on the object store creates a new identifier for the modified object.

An object stored in the object store may include data or metadata. An object storing metadata may be described as a metadata object. In an example, the system 100 may use an object index that associates object records for each of the objects with a reference storage location to persist the objects to the persistent storage. In an example, the object index may map the object to a reference count of the object. The reference count may be incremented when an object is stored again to avoid duplication of the object in the object store. The reference count may be decremented when an object is deleted. The object store may deallocate the object with a reference count of zero to clear unused space periodically. In an example, the object store may use the object index to store, de-duplicate, backup, synchronize objects stored in the object store.

The objects in the object store may exhibit a hierarchical relationship. For example, a parent object may include the object signature of a child object in the object store. The grandparent of the child object may include the object signature of the parent object and the like. This hierarchical relationship may continue until the root object. The root object may include the object signature of a child object directly below the root object in the hierarchy. In an example, modifying an existing object creates a new object. The object store uses the content of the object to encode the object signature. Modifying the content of the object changes the object signature, in other words, generating a new object in the object store. In an example, modifying an object in the object store generates a new object in the object store with an object signature generated according to the cryptographic function. In an example, the old object prior to modification may not be removed from the object store after the modified object is generated. For example, the system may retain the old object because a different parent object may reference the old object. Thus, changes to an object or creating a new object in the object store percolates up to the parent object storing the object signature of the modified or new object until the change percolates to the root object.

For example, in an object store assume the objects are directories or files stored in the directory. A metadata object such as a directory in a file system may include the object signature of each child object in the directory. The metadata object may include other directories. When a child object content is modified in a directory, the identifier of the changed child object is determined using the cryptographic function. Similarly, a new object in a directory changes the contents of the directory. In both instances, the metadata object content changes and the object signature of the metadata object is determined using the cryptographic function. When content of an object changes or a new object is generated, the object signature of the object changes, because the object signature is based on the content of the object. This change percolates upwards towards the root object.

In an example, changing the cryptographic function of the object store changes the building blocks of the object store. In an object store examples of building blocks that may be affected by the change include logical separation of data, deduplication of data, indexing and access to the data and the like. In an object store such as a blockchain storage system used for peer-to-peer storage of audited data, changing the cryptographic function may change the building blocks of the blockchain storage system. For example, in an object store such as the blockchain each block may be an object in the blockchain storage system. In a blockchain, each new block of blockchain includes a cryptographic object signature of the previous block generated using a cryptographic function. Changing the cryptographic function used in a new block of the blockchain changes the basic building blocks of the blockchain. In an example, the system 100 may allow migration from a first cryptographic function to a second cryptographic function for a blockchain without re-encoding the old blocks. The system 100 may permit access to the blocks with the second cryptographic function and the blocks with the first cryptographic function using a variable stored in each block to indicate the cryptographic function used for the block. The first blocks without an object signature block or the variable in the object signature block may be assumed to use the first cryptographic function.

In an example, the system 100 may generate an object signature for an object according to a first cryptographic function. In an example, the object signature may be unique globally. For example, the system 100 may encode the object signature for each object in the object store using an SHA-1 cryptographic function. Identification of security threats that target cryptographic functions may cause migration to a second cryptographic function. In an example, the first cryptographic function may be an old cryptographic function. The first cryptographic function may have security flaws. The system may replace the first cryptographic function with the second cryptographic function to rectify the security flaw.

The system 100 may according to an example of the present disclosure implement a second cryptographic function for generating an object signature for an object in the object store, in place of the first cryptographic function used to encode the object signature for objects that are currently stored in the object store. In an example, the system 100 may store the object and the object record of the object in persistent storage alongside objects that were generated using the first cryptographic function. In an example, the system 100 may switch to the second cryptographic function at a certain synchronized switching time. For example, a certain time elapses after the switching time is acknowledged by a remote network node and the acknowledgment is received by the local network node. The system 100 may use the second cryptographic function to generate an object signature and may indicate the object signature used for the object in an object record. For example, the system 100 may use an unused bit in the object record of the object to identify the cryptographic function used to encode the object signature for that object. In another example, the system 100 may assume the first cryptographic function was used when the object record does not indicate the cryptographic function.

In an example, the system 100 may access an object in the object store with an object signature generated according to the first cryptographic function after the synchronized switch over. In an example, the system 100 may access an object in the object store with an object signature generated according to the second cryptographic function after the synchronized switch over. The system 100 may use the object record to identify the cryptographic signature.

In another example, the system 100 may generate an object signature according to a second cryptographic function for an object in the object store. The system 100 may store the object and the object record of the object to persistent storage. In an example, the system 100 may process the modification of the parent object contents when resources are available. The system 100 may identify the cryptographic function for an object stored in the object store from the object record. The system 100 may use the object index to retrieve the object record. The system 100 may modify the parent object by including the object signature of the child object in the parent object. The system 100 may re-encode the object signature of the parent object using the cryptographic function identified in the object record. In an example, the system 100 may assume the object signature was generated according to the first cryptographic function when the object record does not identify a cryptographic function. In an example, of synchronized switchover, the system 100 may re-encode the object signatures using the second cryptographic function after the switchover time if an object is modified or accessed after the switchover time. For example, the object accessed may have modified properties such as read or access time. Therefore, the system 100 may regenerate an object signature of the object according to the second cryptographic function. In another example, the system 100 may use the object signature of the object generated according to the first cryptographic function when the object is data is not modified but merely accessed. The system 100 may thus allow the object signatures generated according to the first cryptographic function and the second cryptographic function to coexist in the persistent storage.

The system 100 may incrementally migrate the object store when the object content is modified. For example, a data object is modified resulting in a new data object. The system 100 may continue to store the first data object based on the reference count of the first data object. For example, two parent objects may reference the first data object. The modified the data object may only be hierarchically related to one of the parent objects. Thus, the system 100 may generate a new object to store the modified data object, while retaining the first data object.

The system 100, allows an object store built around the unique object identifier to be incrementally upgraded without migrating all the objects to the second cryptographic function at once. Also, the system 100, allows access to an object referenced by an object signature generated using a first cryptographic function, while also allowing access to other objects referenced by an object signature generated using the second cryptographic function.

For example, the system 100 may migrate an object store from an SHA-1 cryptographic function (i.e., first cryptographic function) to an SHA-256 cryptographic function (i.e., second cryptographic function). The system 100 may implement the second cryptographic function without re-encoding all objects in the object store. Also, the system 100 may allow access to objects in the object store that have an object signature generated using the first cryptographic function.

The machine readable instructions 106 may include instructions 108 executable by a processor 102. The machine readable instructions 106 may include instructions 108 to receive a second cryptographic function. In an example, the instructions 108 may receive the second cryptographic function to migrate to from an object store based on a first cryptographic function. For example, the system 100 may receive instructions to migrate from SHA-1 to SHA-256. In an example, the cryptographic functions may be implemented using hardware, machine readable instructions or as a hybrid. In an example, a node in a plurality of nodes may use machine readable instructions stored in specialized hardware. For example, machine readable instructions may be for a Field Programmable Gate Array that runs on a board independent of the central processing unit in a computer. In an example, the cryptographic function may be implemented using machine readable instructions as part of the kernel or user space in an operating system.

For example, in a federated network of a plurality of nodes with local object stores, each node that has an object store may use a different implementation such as software, hardware or hybrid for encoding object signatures of an object. A node on the federated network may use a hashing hardware or cryptographic encoding hardware for the cryptographic function, while another node on the network may use a software-based cryptographic function. In an example, the machine readable instructions 108 may receive the second cryptographic function to allow the system 100 to generate SHA-1 object signatures in software, and instructions to migrate the cryptographic encoding hardware to implement SHA-265 for object signatures. In other examples, the instructions 108 may allow a node to use two different cryptographic functions on a cryptographic encoding hardware.

In an example, the instructions 108 to receive a cryptographic function may be received from a controller of a node located in a plurality of nodes connected via a network. In an example, a controller of a node may send instructions to a peer node to use an SHA-256 cryptographic function. The instructions may specify the use of an object record to store an indication of the cryptographic function used to encode the object signature. For example, the system 100 may use the object record of an object to identify the cryptographic function such as the first cryptographic function or the second cryptographic function to when retrieving an object or to identify the cryptographic function to use for the parent object, while updating the contents of the parent object.

The machine readable instructions 106 may include instructions 110 to receive an input/output (I/O) request. For example, a federated network, including a plurality of nodes or other systems connected to the nodes, may host virtual machines hosting operating systems. The system 100 may receive an I/O request from a virtual machine. In an example, the virtual machine may interface with a layer known as a namespace layer. The namespace layer may manage the I/O request and the object store and manage communication between nodes on the federated network. In other examples, the system 100 may receive an I/O request from a node in the federated network. For example, the system 100 may receive an I/O request during a scheduled backup operation, during replication of objects to a remote network node, during cloning of objects on a remote network node and the like.

In an example, the I/O request may affect an object in the file system. For example, the I/O request may modify an existing object or generate a new object. In an example, an I/O request affecting an object may request storage of an object, modification of a stored object or deletion of a stored object.

The machine readable instructions 106 may include instructions 112 to encode the affected object according to the second cryptographic function. The second cryptographic function may also be described as a received cryptographic function. In an example, the instructions 112 may encode a new object or a modified object (i.e., an existing object that is modified) because of the I/O request according to the second cryptographic function. The instructions 112 may determine an object signature of the new or modified object based on the content of the new object or modified object. In an example, the system 100 may encode all new objects using a cryptographic function such as the first cryptographic function unless specified otherwise using the object record.

The machine readable instructions 106 may include instructions 114 to persist the affected object alongside other objects in the object store encoded or identified according to the first cryptographic function. In an example, persisting the affected object may mean writing the modified object or new object to persistent storage.

The system 100 may also generate an object record for the modified object or new object. In an example, system 100 may update the object index with the object record of a new object or modified object. In an example, modifying an object may create a new object, while the unmodified object or old object may not be removed after the new object is created. For example, the system 100 may wait until resources such as processing power, memory or the like are available for deallocating the objects or until sufficient dead objects are available for effective deallocation. In an example, the original object may be encoded according to the first cryptographic function and the modified object may be encoded according to the second cryptographic function.

In an example, the system may store a modifier associated with the parent object to allow access to the child encoded according to the second cryptographic function until the parent object is modified and persisted. In an example, the system 100 may access a parent object and determine the cryptographic function used based on the modifier associated with the parent object. The modifier may be persisted to persistent storage to preserve changes until the parent objects are updated. The object index may be updated to indicate the cryptographic function used for the new object. In an example, the object index may also include the cryptographic function used for the new object's object signature. In an example, the system 100 may retrieve an object record from the object index that does not include an indication of the cryptographic function. In an example, the system 100 may assume the object that the object record maps to was encoded according to a first cryptographic function. In an example, the system 100 may re-encode the first object using the second cryptographic function, generate a new object record for the first object and store the updated details in the object index. The system 100 may also store the modified object and store a corresponding object record for the modified object in the object index. For example, when the object reference count in an object record of an object is more than one, two or more parent objects may reference the object. The modification of contents of the object may create a child object that relates to only one of the parent objects. The system 100 may thus retain both the first object and the modified object. The system 100 may store both the first object and the modified object alongside each other. In an example, the first object may be encoded according to the first cryptographic function and the modified object may be encoded according to the second cryptographic function.

In an example, the object record may include an indication of the object signature of an object using the first cryptographic function and the second cryptographic function. Thus, the system 100 may use the stored cryptographic function for an object. The object record allows the system 100 to receive a second I/O operation or another I/O operation affecting an object in the object store to identify objects with an object signature generated using the first cryptographic function or the second cryptographic function. The system 100 may determine the cryptographic function of the cryptographic signature of the parent object. The system 100 may determine whether the object signature of the second object in the parent object matches the object signature of the second object in the object record. In response to a determination that the object signatures match the system 100 may retrieve the requested object.

In an example, the system 100 may use the object signature to identify the cryptographic function used to encode the object. In another example, the system 100 may determine the cryptographic function of the object and modify an object reference count in the object index. For example, if an object is stored multiple times, the object reference count in an object record of that object may be incremented instead of storing the object multiple times on persistent storage. Similarly, deletions of the object may be implemented as decrements of the object reference count in an object record. In an example, a network of nodes may form a hive of objects as described with reference to FIG. 3. The network of nodes may synchronize the cryptographic function migration or transition using a hive negotiation as will be discussed with reference to FIG. 5.

During I/O operations accessing an object, the system 100 may use the object index to identify the cryptographic function of the object affected by an I/O request. In an example, accessing an object in the object store may modify the parameters of the object such as the time of access and the like. In an example, the system 100 may generate a new object signature for objects accessed during an I/O request. The system 100 may use rules to prioritize generation of new signatures for objects based on the system utilization, frequency of requests, availability of system resources and the like. For example, the system 100 may change the object signatures of frequently accessed objects. In other examples, the system 100 may migrate the object signature of an object as and when an object is accessed.

In an example, an object store may include a hierarchy of stored objects. For example, the new objects generated during the I/O request described above may be related objects already present in the object store. The object store may include an object index or object cache to retrieve recently accessed objects without moving from the root object downwards. For example, a virtual machine running on a node or a system accessing the node may include copies of common files in the operating system and/or common programs installed on the operating system.

The object store may store these common elements in objects, and store a portion of the object index in a cache memory for faster access. For example, during an I/O request from a virtual machine, a .NET library may be stored on a virtual machine. The .NET library may be installed, accessed, and used by many virtual machines during execution of programs in a plurality of instances of the virtual machines. The object store stores an object including the .NET library once in persistent memory to avoid duplication. The system 100 may store the location of the .NET library in a cache memory for faster retrieval. Also, the system may use the object reference count in the object record to prevent duplication of objects in the object store. In an example, all objects stored in persistent memory of an object store may be accessed from a root object. In other words, root object may contain details of all objects stored on the object store. For example, the root object may contain details of child object signatures. The child object of the root object may, in turn, have object signatures of its child object and so on.

Also, modifying a child object or creating a new child object changes the contents of a parent object. In an example, the system 100 may generate the modified parent object by modifying the content of the parent object. For example, the system 100 may add the object signature of the child object and/or remove the object signature of a child object that has been dereferenced. In an example, the system 100 may retain the original parent object alongside the modified parent object. For example, the system may retain the original parent object and the modified parent object for reverting the state of the object store to a prior state. The objects may exhibit relationships such as peers, child, grandchild, parent, grandparent and the like. In an example, a child object may be all objects that are related to a parent object including a child of a child object and the like. The root object is related to all other objects and therefore, changes to any child object of the root object may change the content of the root object. The system 100 may determine the object signature of the parent object according to the cryptographic function encoding the affected object. In an example, the system 100 may determine the cryptographic function of the affected object based on the object record of the child object. The system 100 may persist parent object with the modified content to the persistent storage.

In an example, the system 100 may determine an object signature for the parent object. The system 100 may persist the object signature of the parent object to the object record associated with the parent object. The system 100 may update or persist the object index with the determined object record. Thus, changes to an object percolate upwards towards the root object. During an I/O operation accessing an object, access to the object is often through a parent object. Thus, the parent objects are updated to reflect changes to the child objects.

Figure 2:
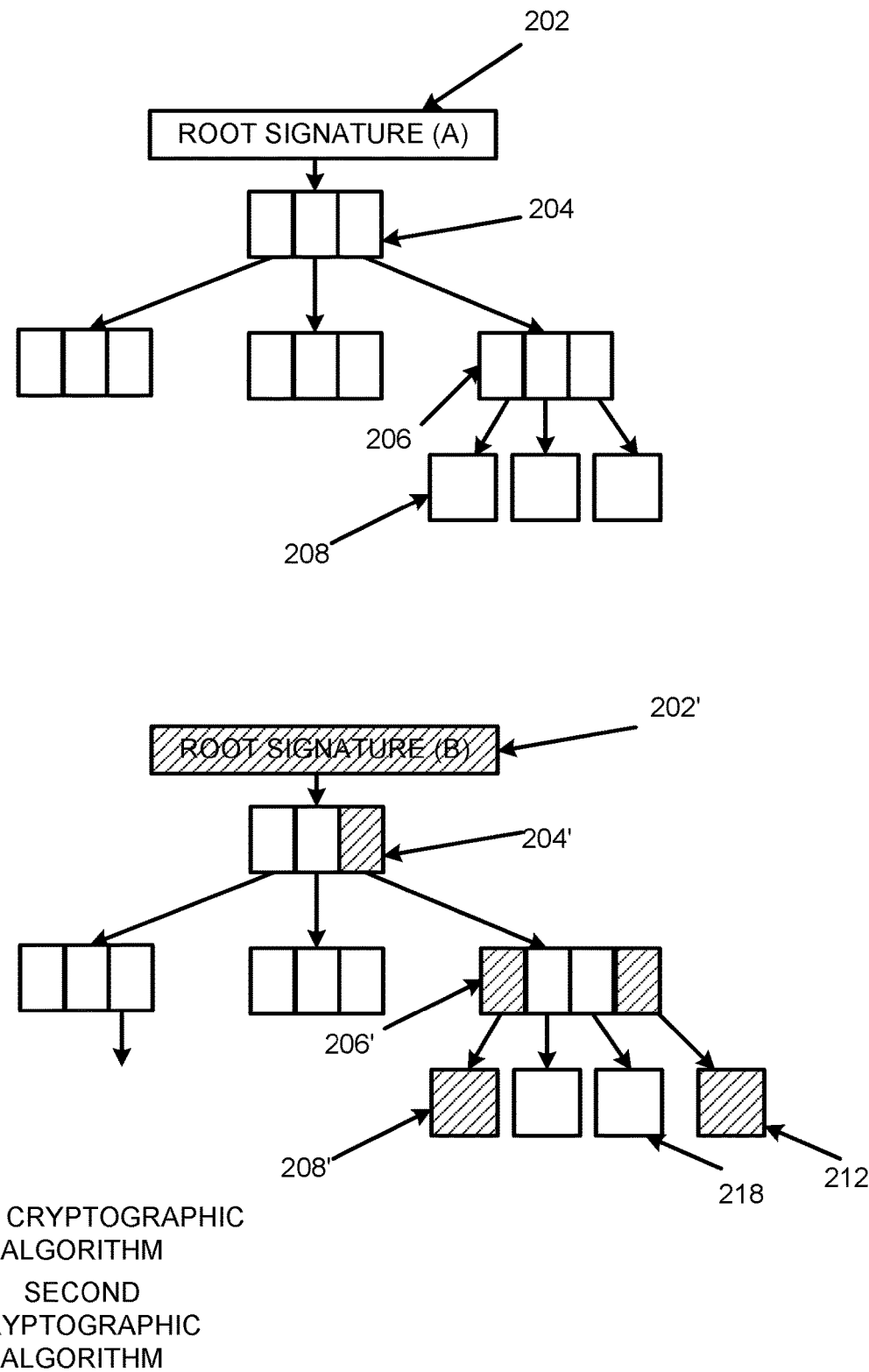
FIG. 2 illustrates an example of object signatures for an object in an object store and migration of object signatures to a second cryptographic function.

Referring to FIG. 2, the figure illustrates an example of object signatures of objects in a storage file system and migration of object signatures to the second cryptographic function from the first cryptographic function. In an example, a node in a system of federated nodes may include an object in an object store with an object signature such as the object signature 202. Assume the object signature 202 identifies the root object in the object store. In an example, the root object contents may include the object signature of the child object in the object store immediately below the root object. The child object of the root object may include the object signature of its children and the like. In an example, the root object may include identifiers of all objects in the object store. In an example, all the child objects are hierarchically related to the root object, because the contents of all the child objects of the root object are in turn determined by the contents the child objects of the child objects of the root object and so on. The object store generates the object signature 202 based on the content of the objects in the object store. The object signature 202 is determined using the first cryptographic function (shown as blocks without patterns in the figure), which results in an object signature based on the content of the root object when the cryptographic function is applied.

Also, when an object is modified to include new content, the modified object may be treated as a new object and the object store encodes a new object signature for the object, i.e., the object with the new content. Similarly, when a new object is stored the object store the system encodes the new object contents according to the cryptographic function used at the time the system encodes the new object. In an example, the new object or modified object alongside the original object. For example, storing the original object may allow the system to restore the file system to a previous state. For example, the root object may include the object signature 204 of its child object as part of its content. Assume the root object includes the object signature of the metadata object identified by object signature 204. The object signature 204 may, in turn depend on object signatures of other objects such as new files in the directory identified the object signature 206. Assume object signature 208 identifies an object in the object store such as an object modified in response to an Input/output operation. The object identified by the object signature 206 is a parent of the object identified by the object signature 208. The object identified by the object signature 206 stores the object signature 208 of its child object. The object identified by the object signature 204 stores the object signature 206 of its child object. For example, a metadata object such as a directory in a filesystem may store the object signatures of its child objects such as files and the like. A change or modification in the content of the object referenced by the object signature 208 results in a change in the content of the object referenced by the object signature 206. Thus, changing the object signature 208 associated with an object changes the object signature 206. The resulting changes cascade up the chain until they result in a change in contents of the root object and consequently change the object signature 202 of the root.

Assume that new objects or objects with contents that are modified are encoded using the second cryptographic function, shown as patterned boxes. In an example, the new objects or modified objects may be encoded using the second cryptographic function after a transition signal from the system 100. In an example, the new object or modified objects may be encoded according to the second cryptographic function for all new objects after a certain point in time, i.e., transition time. For example, as discussed above with reference to FIG. 1, when a new object is generated, such as the object identified by the object signature 212, the system 100 may determine the object signature 212 according to the second cryptographic function. In another example, when the content of the object referenced by the object signature 208 is changed, a new object signature 208' is encoded according to the second cryptographic function, as shown in FIG. 2. The system 100 may retain the old object identified by the object signature 208 alongside the new object identified by the object signature 208'. In FIG. 2, objects identified with a prime notation (') are modified objects and the system 100 may retain the modified objects along with the original objects without the prime notation ('). Examples of modified objects shown in the figure includes 202', 204', 206' and 208', corresponding to objects 202, 204, 206 and 208. In an example, the system my delete an old object, e.g., 208 after storing the new object 208'. For example, the system 100 may rehash an object encoded according to the first cryptographic function when the system 100 has resources available. The system 100 may then delete the old object 208.

In another example, when the object identified by the object signature 208 is referenced by more than one parent object, the system 100 may store both objects with the object signature 208 and the object signature 208'. The system 100 may include the object signature 208' in the contents of the modified parent object identified by the object signature 206'. In other words, the content of the object referenced by the object signature 206 is modified to include the object signature 208' and a new object signature 206' is determined according to the cryptographic function used to encode the child object identified by the object signature 208'. In an example, the system 100 may store both the original object identified by the object signature 206 and the modified object identified by the object signature 206'.

In an example, the object identified by the object signature 206 may be a metadata object such as directory in a file system. The object identified by the object signature 206 may be modified to include the new object signature 208' of a new object or the modified object. An object signature 206' may be generated according to the first cryptographic function for the object identified by the object signature 206 prior to the I/O operation. In an example, the system 100 may store the object identified by the object signature 206 and the 206' alongside each other. In another example, the object signature 212 may be included in its parent object after the object identified by the object signature 212 is stored in the parent object identified by the object signature 206'.

In another example, the system 100 may modify the contents of the object identified by the object signature 206 to include the object signature 212 and the object signature 208'. The system 100 may then determine the object signature of the modified object, i.e., 206' according to the second cryptographic function. In an example, the rollup between hierarchical levels may be delayed and the object signature 212 and the object signature 206' may be include together.

The new object signature 206' may be included in the contents of its parent object identified by the object signature 204'. The changes percolate upward until the root object identified by the object signature 202 is updated to include the new object signature 204' of its child. Finally, the root object may be encoded using the second cryptographic function to encode the new object signature 202' of the root object. Thus, the object signature 202 of the root object is updated to the new object signature 202' due to change in the content of a new object or modified object identified by the object signature 208'. In an example, the objects 208, 206, 204 and 202 may be stored alongside the object 208', 206', 204' and 202' such as to allow roll back of the object store to an earlier time.

In examples, the system 100 may store an indication of the cryptographic function used to obtain the object signature 208', 206', 204', 202' in the object index. For example, the system may store the identity of the second cryptographic function for the objects identified by the object signature 208', 206', 204' and 202' in the object index. The system 100 may resolve a reference to the object identified by the object signature 208' by look up against the object index to locate the object record associated with the object identified by the object signature 208'. For example, the system may encode the object signature of an object received during an I/O request. The system 100 may then determine the object record from the object index for the generated object signature. The system 100 may determine the cryptographic function used to encode the object signature 208'. The system 100 may use the object signature and the object index to locate, retrieve the object and/or modify the object in the object store. Similarly, when an object identified by the object signature 212 is requested, the system 100 may look up against the object index to identify the object record associated with the object identified by the object signature 212. The system 100 may determine the cryptographic function used to encode the object signature 212 based on the object record, to retrieve the object and/or modify the object. For example, the system 100 may determine the object record entry for an indication of the cryptographic function used to encode the object signature 212. In an example, the system 100 may identify the absence of an entry in the object record as indicating the object signature 212 was generated using the first cryptographic function.

The system 100 may then retrieve the object and/or modify the object based on the object index. In examples, the system 100 may look up an object identified by the object signature 218 determined according to the first cryptographic function from the root object identified by 202'. The root object 202' includes the object signature of the child object 204'. The child object 204' in turn includes the object signature of the 206' child object. The child object with the object signature 206' includes the object signature of the object 218. In examples, the system 100 may determine the cryptographic function used to encode the object signature 218, based on data received during an I/O operation such as from a virtual machine. Thus, system 100 may continue to access the object identified by the object signature 218 determined based on the first cryptographic function, post-migration. In an example, the system 100 may access the objects identified by the object signature 212. The object signature 212 may be determined according to the second cryptographic function. The system 100 may determine the cryptographic function for an object signature based on the object record associated with the object signature 212.

In an example, the system 100 may store the first object signature generated using the first cryptographic function and the object signature generated using the second cryptographic function during migration of the cryptographic function. For example, the object referenced by object signature 206 may be updated to include the object signature 208' and remove the object signature 208. The system may thus identify the new object and the old object to de-duplicate new objects that are similar to objects stored in the object store. In an example, the system 100 may stop including the object signatures generated using the first cryptographic function based on a policy. For example, the system 100 may stop including the object signatures when there are less than a certain threshold of objects that have object signatures generated using the first cryptographic function in a hive. In another example, the system 100 may stop including the object signatures when the computational resources needed to migrate the rest of the objects identified the first cryptographic function are less than the computational resources saved due to deduplication identification and selective encoding of all the duplicate references. In examples, computational resources may include processing power, memory, wear rate of persistent storage media and the like.

Updating the cryptographic function used to encode the object signature of the new object identified by 212 or the modification of the object identified by 208 percolates upwards towards the root object. The system 100 may refer to an object index to identify the cryptographic function used to encode the object signature of an affected object identified in the I/O operation. Thus, the migration may be incrementally performed, allowing for use of the mixed cryptographic functions in object store that may rely on the object signature to perform the basic functions of a file system.

Figure 3:
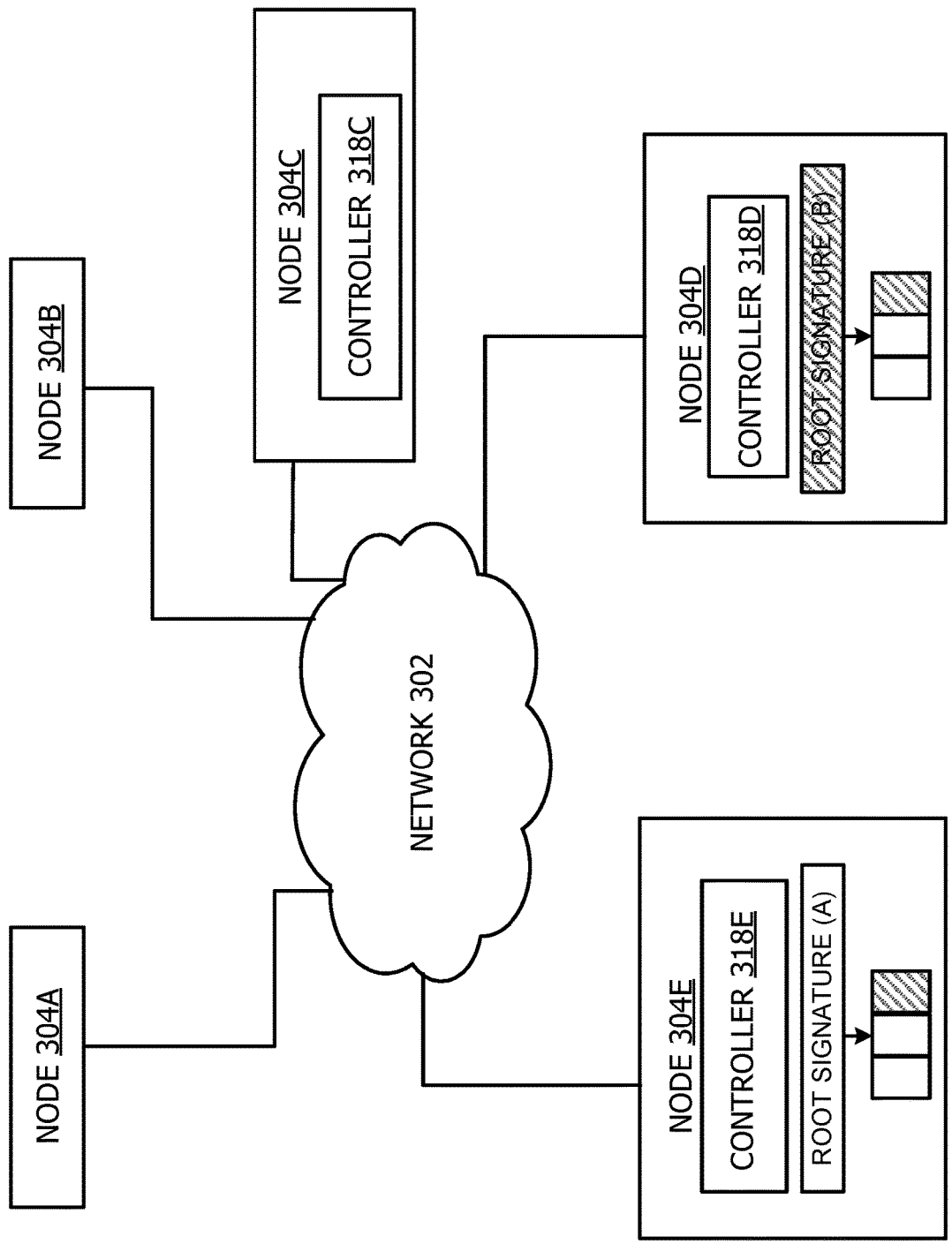
FIG. 3 illustrates an example of a system comprising a federated system of nodes that may synchronize objects between the nodes.

FIG. 3 depicts an example of the system 100 implemented as a federated system of nodes according to an example to synchronize cryptographic function migration. The nodes 304 shown as 304A, 304B, 304C, 304D and 304E may interact through a network 302. The network 302 may be any network such as a local area network, wide area network, etc. In an example, the network may be a wireless network such as a microwave link, satellite link, cellular link, laser link, fiber optic linked, etc. In an example, the nodes may be collocated within the same facility. In other examples, the nodes may be located in distinct geographical locations. The nodes 304 may include a controller 318 shown as 318E, 318D and 318C to communicate with other nodes. In an example, the controller 318 (e.g., 318E, 318D, 318C etc.,) may be implemented as a virtual controller, a hardware controller or a hybrid. In an example, node 304D and node 304E may synchronize objects after transition from the first cryptographic signature to the second cryptographic signature.

In an example, the controller 318 (e.g. 318E, 318D, 318C etc.,) may use a namespace layer to manage and maintain the object storage system. The system 100, may receive an I/O request to store a new object. The controller 318E of node 304E may determine the cryptographic function based on the cryptographic function indicated in the object record or the object storage index. The controller 318E may then determine the object signature of the new object using the second cryptographic function. The controller 318E may then update the object record and the object index. As discussed above with reference to FIG. 2, this change may percolate upwards in the object store. In an example, the controller 318E may include instructions to continue to process objects at a second hierarchical level or distance of m−1 from the modified grandparent object until the root object is reached. The controller 318E may encode and persist grandparent object with its encoded object signature between the modified grandparent object and the root object one hierarchical level at a time. In an example, one hierarchical level at a time may mean the parent object of the previously modified and persisted object. The controller 318E may modify the root object to include an object signature of the root object's child object. The controller 318E may encode the object signature of the root object according to second cryptographic function with the object signature of the child object of the root object. In an example, the root object may have more than one child object. The controller 318E may modify the root object with the object signature of the child object that was modified according to the second cryptographic function. The controller 318E may persist the root object to the object store. In an example, to persist an object to the object store may mean persist the object to a persistent storage.

In an example, the node 304E may have a policy requiring redundant backups to node 304D. In other examples, the nodes 304C and 304B may serve as storage locations that may be utilized based on availability or policy settings on the nodes or systems accessing the nodes. The controller 318E may communicate with the controller 318D to synchronize the files in the object store. The object signatures of objects (as illustrated above in FIG. 2 with objects signatures 208', 206', 204' and 202') are generated based on the contents of the objects. The objects such as new data having the same bits of information will have the same object signature. The new objects may be written to persistent storage only when the new objects have a new object signature. During migration, as the new objects are generated using the second cryptographic function, the system 100 may replicate objects that were previously stored in the object store using the first cryptographic function. In an example, the controller 318E may determine the first cryptographic function and the second cryptographic function to identify duplicate objects in the object store identified using either cryptographic function.

In an example, the controller 318E and 318D may synchronize the storage of objects in the persistent memory using the local object store on the nodes 304E and 304D. For example, during back up operations, the controller 318E may transmit to controller 318D the digests of objects in the object store such as the object signature of the root object and the root object. In an example, the object signature of the root object is a snapshot of the entire file system. The node 304D may use the object signature of the root object and the root object contents received from node 304E to determine the changes in the files. Any new objects generated on node 304E may be synchronized across the nodes 304D and 304E by transferring the objects that are new on node 304E to the node 304D. This synchronization of objects across nodes depends on the cryptographic function.

In an example, the nodes 304E and 304D may negotiate a transition for the second cryptographic function for files. Negotiating a transition for the second cryptographic function between nodes 304E and 304D allows the nodes to maintain synchronized copies of objects. As discussed above changes to new objects may result in changes all the way up to the root object. In an example, the controller may determine a parent object of the new object, such as the imap object. The controller may then transmit a synchronization notification to a network node, i.e., node 304D that may include the parent object of the new object. For example, node 304E may send a synchronization notification to the network node, i.e., node 304D. The controller 318E may determine the node 304D has the parent object of the new object and transmit a synchronization notification to the controller 318D to allow a synchronized switchover to the second cryptographic function. The controller 318E may receive an acknowledgment from the network node such as node 304D as redundant backup of node 304.

The controller 318E may then commit the new object to persistent storage. Persistent storage may be any media including hard drives, tape drives, nonvolatile solid-state storage such as solid-state disks, NVMe storage, customized storage based on solid-state chips, memristors, Optane™ storage and the like. The controller 318E may update an object index or the object record to indicate the cryptographic function used for generating the objects. For example, a bit may be flipped in an object record associated with the object when the object signature is determined using the SHA-256 cryptographic function. In an example, the controller 318D may synchronize changes all the way up to the root object. The controller 318D may verify the object signature of the new object, intermediate objects between the new object and the root object and the object signature of the root object to the object signatures for the respective object on another node 304E after synchronization. In an example, the controller 318D may synchronize the changes to the new object, without verifying the object signature of the intermediate objects. The controller 318D may verify whether the object signature of the new object matches the object signature of the new object on another controller, e.g., controller 318E. Once the controller 318D verifies synchronization of the new object and the object signature, the controller 318D may assume the hive migration was successful. The controller 318D may not verify the changes to intermediate objects between the root object and the parent object. For example, the controller 318D may determine the appropriate object signatures for the other parent objects by changing the contents of the parent objects and generating an object signature for the parents locally on the node 304D.

Thus, the information may be synchronized between different nodes, during the cryptographic function migration. In an example, the system 100 may verify the synchronization is accurate by comparing the object signature of the root object on a node such as node 304D with the object signature of the root object on another node 304E (e.g., a remote network node). The system 100 may incorporate the intents generated on a node containing the changes that have not been percolated towards the root object before comparing the object signature of the root object stored on two nodes (e.g. a local network node 304E and a remote network node 304D).

In an example, the controller 318E may receive an I/O modifying an object in the file system. For example, the I/O request may delete a file, add to the contents of the file or remove the contents of an object. The controller 318E may determine the parent object of the modified object. In an example, the object modified may be accessed using a parent object. The controller 318E may determine the parent object based on the hierarchical relationship of the stored objects. In other examples, the controller 318E may perform a lookup on the object index to identify the parent object. The controller 318E may determine whether the parent object is the root object of the file system. In response to a determination that the parent object is not the root object, the controller 318E may identify a grandparent object of the child object, i.e., parent of the parent object at a distance of n−1 from the parent object, where n is the distance between the parent object and the root object. The controller 318E may regenerate the contents of the grandparent object using the modified object signature of the parent object. The controller 318E may then write the modified grandparent object and update the object record of the grandparent object to the object store. In an example, the object store may be stored in the persistent storage on the node 304E.

In an example, with reference to the illustration of FIG. 2, the object signature 208' is hierarchically located four levels below the root object. In another example, the object identified by the object signature 204' is at a first hierarchical distance from the root object 202'. In this example, the first hierarchical distance may be expressed as n−1, where n is the distance between the parent object and the root object. The controller 318E may determine the parent object of the object signature 208', such as the object identified with the object signature 206. The controller 318E may update the contents of the parent object with the object signature 208' and encode the object signature 206' for the parent object. The controller 318E may determine whether the object signature 206' points to the root object. Based on a determination that the object signature 206' does not point to the root object, the controller 318E may then determine a parent of the object identified using the object signature 206' or the grandparent of the child object identified by object signature 208'. The grandparent object 204 is identified by the object signature 206'. The controller 318E may then determine an object signature 204' for the grandparent object after updating the content of the grandparent object to include the reference to the child object. The system may commit the grandparent object to persistent storage and continue looking for grandparent objects at a second hierarchical distance of m−1 from the last object modified grandparent object, where m is the distance between the root object and the modified grandparent object until the controller 318E reaches the root object. In an example, the controller 318E may persist the grandparent object with the determined object signature to the object store on the local network node. The controller 318E may generate a new object signature for each object between the grandparent object and the root object after modifying each object to include an object signature of each object's child object one hierarchical level at a time. In an example, one hierarchical level at a time may mean the parent object of the previously modified and persisted object. The controller 318E may modify the root object with an object signature of the root object's child object. The controller 318E may generate a new object signature for the root object. The controller 318E may persist the root object to the object store. Although, the FIG. 2 shows four hierarchical levels there may be more than four hierarchical levels between the root object and the child object.

As shown in FIG. 2 the controller may identify the object signature 204 and commit the object signature 204' and finally identify the root object signature 202 and commit the object signature 202' with the second cryptographic function. In an example, the controller may encode the new object signature for the parent object using the second cryptographic function and commit the parent object with the new object signature to the object store. In an example, the controller 318D may commit changes simultaneously to the local object store (i.e., local network node's object store) and the remote object store (i.e., remote network node's object store) through synchronization requests sent to the controller 318E. In other examples, the controller 318D may commit changes locally without synchronizing the commits to the remote server. During synchronization of updates, controller 318D may send a digest of object updates with the second cryptographic function to allow the controller 318E to replicate the updates locally. In an example, an I/O request may modify an object farthest from the root object such as a child object. In other examples, an I/O request may modify an object in the middle of the hierarchical DAG (e.g., a tree). For example, changes to a directory may replace the parents objects but retain the child objects.

In an example, a hive may refer to a set of objects that belong to a virtual machine. In another example, a hive may refer to a set of objects that are stored in an abject store on a local node with a hierarchical relationship from the root object. The hive may be hosted on a system of federated nodes that communicate with each other such as the nodes 304A, 204B, 304C, 304E and 304D. In an example, a DAG (e.g., an object tree) with objects related to the root object may be synchronized simultaneously across multiple nodes 304 (e.g., 304A, 304B, 304C, 304D and the like). In an example, each node is upgraded to the second cryptographic function using a commit message sent to each of the nodes 304 (e.g., 304A, 304B, 304C, 304D and the like). The controller 318 (e.g., 318E, 318D) may check the nodes that are ready to perform the updates before pushing the commit message. For example, some nodes 304 (e.g., 304E, 304D, 304C, 304D and the like) may not have updates to machine readable instructions on a hardware to support the second cryptographic function. The controller 318E may, in an example, act as a primary. The controller 318E may determine that the controller 318C can understand and implement the second cryptographic function and initiate the hive version negotiation with the controller 318C. The negotiations may include a handshake. The primary controller 318E may control the version change and initiate the migration and both controllers 318E and 318C may roll up the new objects or modified objects to the root. In an example, the controller 318E may determine a root object signature of the root object and compare the root object signature of the root object to the root object signature on other nodes. In other examples, the controller 318E may determine the signatures of an object and child objects underneath the object such as a metadata object and compare the signatures across the network to ensure the objects are synchronized.

Figure 4:
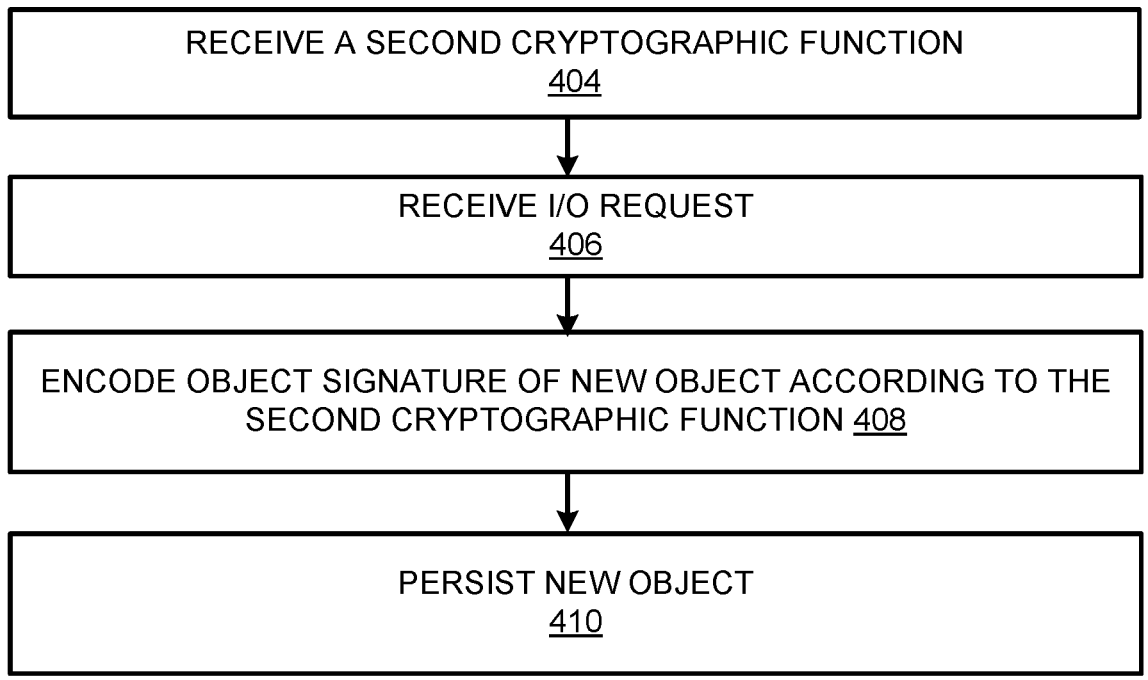
FIG. 4 illustrates a method according to an example for migrating an object store.

FIG. 4 illustrates a method 400 according to an example for migrating an object store. The method 400 may be performed by the system 100 shown in FIG. 1 or the system of nodes shown in FIG. 3. The processor 102 executing the machine readable instructions 106 stored on a non-transitory computer readable medium 104 may perform the method 400. As discussed above with reference to FIG. 1, any cryptographic function may be used. In an example, the system 100 may include an object store on a local object store. The local object store may save the objects such as data objects and metadata objects on persistent storage such as a solid-state drive, hard drive, NVMe and the like. Each object stored in the local object store may have a globally unique object signature. For example, as discussed above with reference to FIG. 3, objects may have the same object signature generated based when the same cryptographic function is applied to the content of the objects. The globally unique object signature may be determined according to the cryptographic function such as SHA-1, SHA-256 and the like. The objects stored in the local object store may exhibit a hierarchical relationship from the root object. For example, objects may be children, peers of other children, parents, grandparents and the like of objects as shown in FIG. 2. The root object can be used to access any object in the object store.

At 404, the system 100 may receive a second cryptographic function. For example, the system 100 may receive the SHA256 cryptographic function for use after transition. In an example, the system 100 may also receive a time for the transition to the second cryptographic function. In another example, the system 100 may receive machine readable instructions to update hardware encryption.

At 406, the system 100 may receive an I/O request. The I/O request may create a new object or modify an existing object. In an example, the system 100 may receive an I/O request from a namespace layer or from virtual machines running on the nodes or accessing the nodes. In other examples, the nodes 304 as discussed above with reference to FIG. 3 may be part of the system 100 and may generate the input/output request.

At 408, the system 100 may determine an object signature for the object being created or modified according to the received I/O request using the second cryptographic function. As discussed above with reference to FIG. 3, the cryptographic function associated with an object may be indicated in the object record associated with an object. For example, a bit value may be set to one in the object record to indicate the cryptographic function used. In an example, the system 100 may determine a new object signature for a modified object. In other examples, the system 100 may determine an object signature for a new object. For example, an object may not be present on the system 100 and may be written to. In other examples, accessing an object may modify the object. For example, updates to a configuration file may modify the object. In other examples, metadata associated with an object may change such as access date. In other examples, reference count objects storing the number of references to an object on the file system may change.

At 410, the system 100 may commit the new object or the modified object and its object signature to the object store. In an example, committing the object and its object signature may mean storing the object at a physical location on a persistent storage device and updating an object index. In an example, the modified object is stored alongside the original object. In other examples, committing or persisting the new object to the object store may mean determining the parent of the object and updating the content of the parent and object signature of the parent. In an example, the updated parent object is stored alongside the original parent object. In other examples, the system 100 may synchronize the changes the across network nodes 304.

Figure 5:
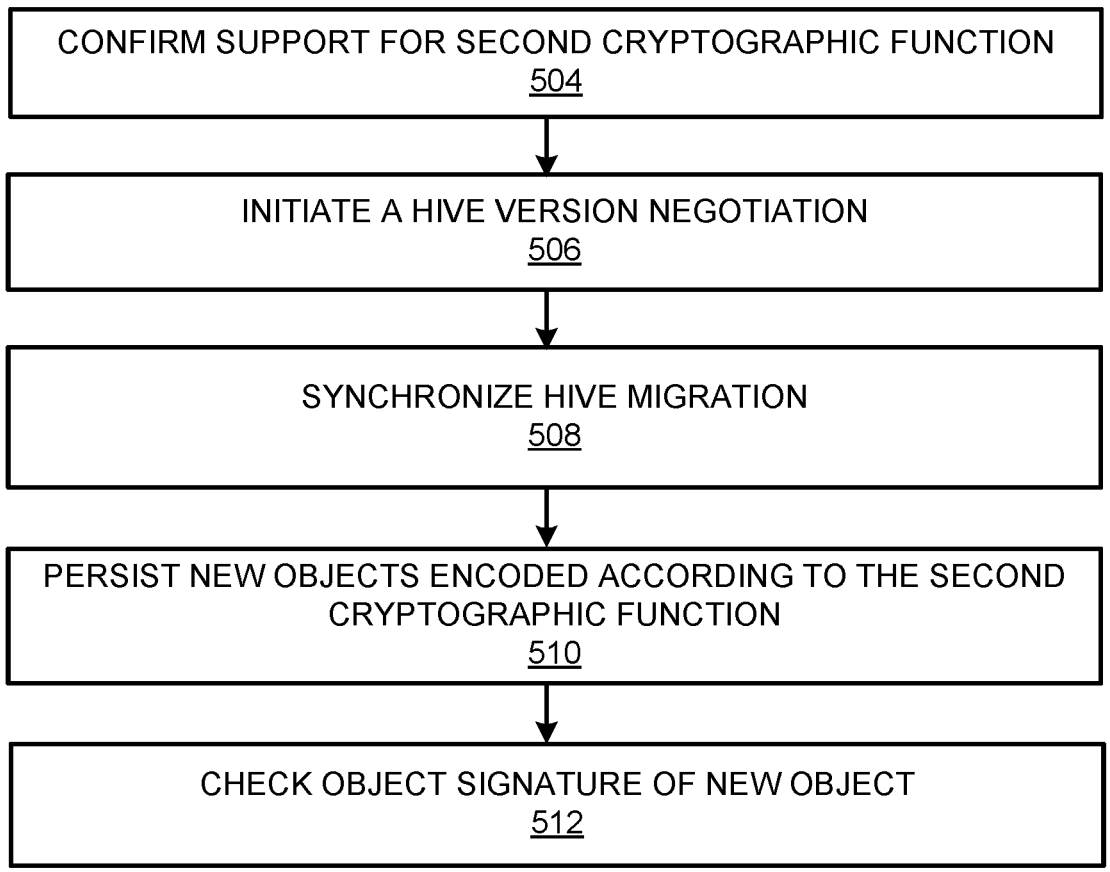
FIG. 5 illustrates a method, according to an example for synchronizing an object store across a network.

FIG. 5 illustrates a method 500 according to an example to upgrade a hive of objects. The method 500 may be performed by the system 100 shown in FIG. 1 or the system of nodes shown in FIG. 3. The method 400 may be performed by the processor 102 executing the machine readable instructions 106 stored on a non-transitory computer readable medium 104.

At 504, the system 100 as described above with reference to FIG. 3, may confirm that the nodes in the federated network, having object signatures that were generated under a first cryptographic function, are ready to update to a second (e.g., new) cryptographic function. For example, the nodes in the federated network may need machine readable instruction updates to hardware used for determining, using to the second cryptographic function, the object signature of objects stored on the object store.

At 506, the system 100 may initiate a hive version negotiation with a node on the federated network to initiate a version negotiation. For example, the system 100 may identify the second cryptographic function to be used, protocols to signal a transition and protocols for verification after transition to the second cryptographic function, and the like.

At 508, the system 100 may synchronize a hive version transition or hive migration. In an example, the hive may be a set of objects that belong to a virtual machine on a federated network of nodes distributed across a network. For example, the system 100 may determine all new modifications to objects or new objects arriving after a certain time may generate an object signature according to the second cryptographic function. In other examples, the system 100 may synchronize a hive version transition using digests of unique object identifiers generated using the second cryptographic function.

At 510, the system 100 may persist the new object or the modified object and the object signature of the modified object or new object generated using the second cryptographic function to the object store. In an example, persisting the object and the object signature may mean storing the modified or new object at a physical location on a persistent storage device and updating the object index. In other examples, committing the new object to the object store may mean determining the parent of the object and updating the content of the parent and the object signature of the parent.

At 512, the system 100 may check the object signature of objects post-transition or just prior to transition between two nodes to verify whether the migration was successful. For example, the object signature of a root object may be used to check whether the migration was successful. In an example, a metadata object signature such as the root object signature may be checked after an updated object signature change is percolated up the hierarchical chain to the root object. In an example, the system may verify the child object signatures just before and/or after the synchronization to verify whether the migration was successful. Once the child object signatures of new objects match, the system may locally roll up the DAG (e.g., the object tree) until the root object is encoded according to the second cryptographic function.

Figure 6:
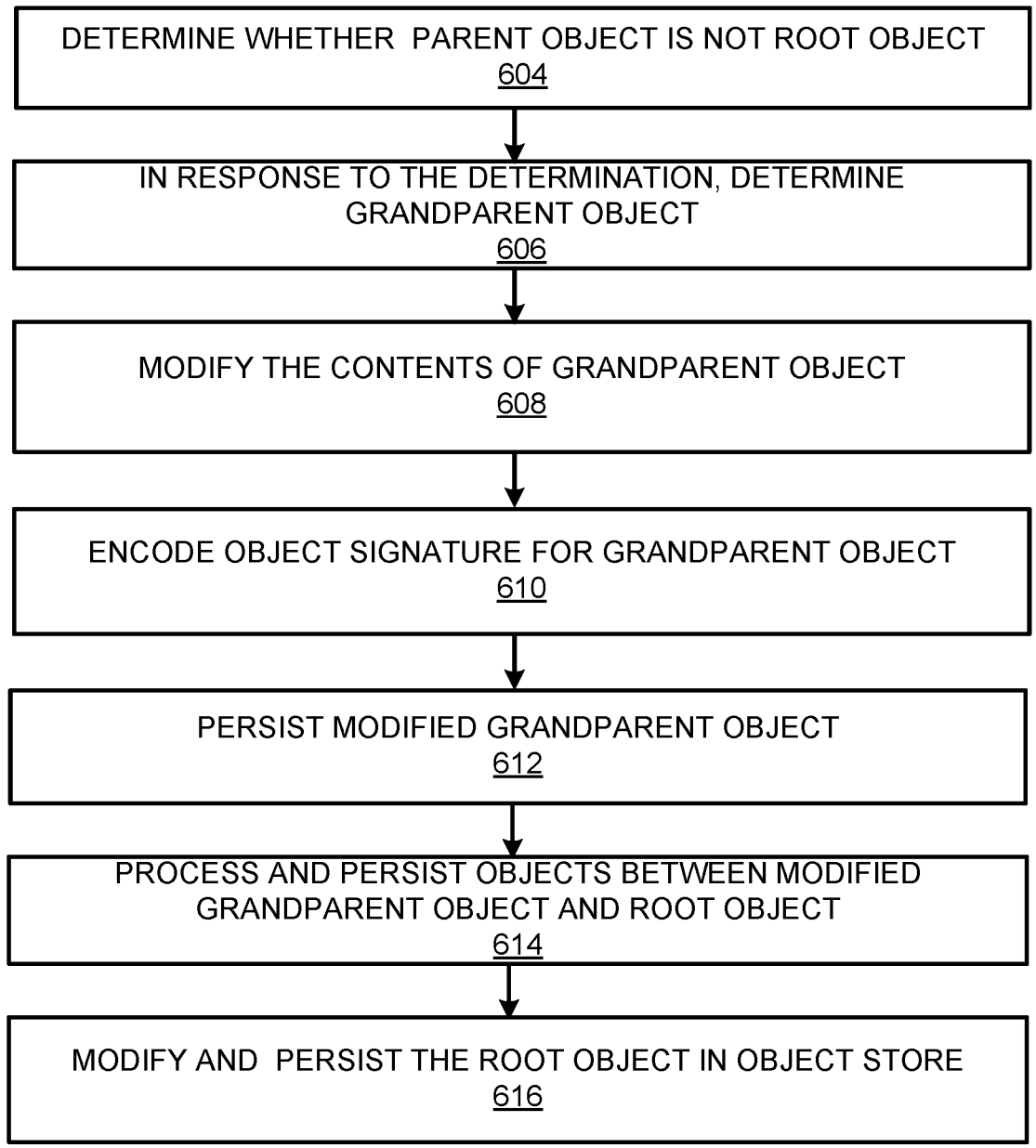
FIG. 6 illustrates a method, according to an example to percolate changes in an object store to the root object.

FIG. 6 illustrates a method 600 according to an example to percolate the changes in an object store to the root object. The method 600 may be performed by the system 100 shown in FIG. 1 or the system of nodes shown in FIG. 3. The method 400 may be performed by the processor 102 executing the machine readable instructions 106 stored on a non-transitory computer readable medium 104.

At 604, the system 100 as described above with reference to FIG. 3, determine whether the parent object is not the root object. In an example, the system 100 may determine whether the signature of the parent object is the same as the signature of the root object.

At 606, the system 100 may in response to a determination that the parent object is not the root object, determine a grandparent object (i.e., parent object of the parent object). The grandparent object may be located one hierarchical level above the parent object in the hierarchy of objects from the root object to the child object. For example, the grandparent object may be at a first hierarchical distance of n−1 where n is the first hierarchical distance between the parent object and the root object.

At 608, the system 100 may modify the contents of the grandparent object to include the object signature of the modified parent object.

At 610, the system 100 may encode an object signature for the modified grandparent object using the second cryptographic function.

At 612, the system 100 may persist the modified grandparent object with the encoded object signature to the object store. In an example, the system 100 may store the modified grandparent object and the object signature of the grandparent object on an a persistent storage. In an example, a local object store may store the modified grandparent object with the encoded object signature of the grandparent object.

At 614, the system 100 may process and persist objects between the modified grandparent object and the root object one hierarical level at a time. In an example, one hierarcical level at a time may refer to objects above the modified object that was persisted last. In an example, the hierarcical level may be one level above the modified grandparent object of step 612 or the parent of the modified grandparent object. The system 100 may include the object signature of the grandparent object in the object and encode an object signature for the grandparent object. The system 100 may persist the object and its object signature to the object store. The system 100 may repeat the process for each object between the modified grandparent object of step 610 and the root object.

At 616, the system 100 may modify the root object to include an object signature of the root object's child object. The system 100 may then encode the encode the root object according to the second cryptographic function and persist the encoded root object to the object store.

While embodiments of the present disclosure have been described with reference to examples, those skilled in the art will be able to make various modifications to the described embodiments without departing from the scope of the claimed embodiments.

What is claimed is:

1. A non-transitory computer readable medium comprising machine readable instructions executable by a processor to:
in an object store to store objects, wherein each of the objects is identified by an object signature generated according to a first cryptographic function, and wherein the objects stored in the object store exhibit a hierarchical relationship from a root object:
receive a request to transition to a second cryptographic function for the object store;
receive an input/output (I/O) request affecting a first object in the object store;
encode an object signature for the affected first object according to the second cryptographic function; and
persist the affected first object in the object store alongside other objects in the object store identified by object signatures encoded according to the first cryptographic function;
receive another I/O request affecting a second object in the object store;
determine an object record associated with the second object;
determine, from a parent object of the second object, a cryptographic function used to encode an object signature of the second object affected by the another I/O request;
determine whether the object signature of the second object, in the parent object of the second object, matches an object signature of the second object in the determined object record; and
based on a determination that the object signature of the second object in the parent object of the second object matches the object signature of the second object in the determined object record, retrieve the second object.

2. The non-transitory computer readable medium of claim 1, wherein the machine readable instructions are executable by the processor to:
generate a parent object of the first object, wherein the parent object of the first object includes the object signature of the first object;
encode an object signature for the parent object of the first object according to the second cryptographic function; and
persist to the object store, the parent object of the first object with the encoded object signature for the parent object.

3. The non-transitory computer readable medium of claim 2, wherein the machine readable instructions are executable by the processor to:
determine an object record associated with the first object; and
persist the determined object record to an object index.

4. The non-transitory computer readable medium of claim 2, wherein the machine readable instructions are executable by the processor to:
determine whether the parent object of the first object is not the root object;
in response to a determination that the parent object of the first object is not the root object, determine a grandparent object of the first object;
modify contents of the grandparent object of the first object to include the object signature of the parent object of the first object, wherein the parent object of the first object is a child object of the grandparent object of the first object;

encode an object signature for the modified grandparent object of the first object using the second cryptographic function;
persist, to the object store, the modified grandparent object of the first object with the encoded object signature for the modified grandparent object;
encode and persist grandparent objects between the modified grandparent object of the first object and the root object one hierarchical level at a time;
modify the root object to include an object signature of a child object of the root object;
encode an object signature for the root object according to the second cryptographic function; and
persist the root object to the object store.

5. The non-transitory computer readable medium of claim 1, wherein the machine readable instructions are executable by the processor to:
transmit a synchronization notification to synchronize the first object on a local network node and a remote network node of a plurality of network nodes, wherein the local network nodes includes a local object store and the remote network node includes a remote object store, and wherein the local network node and the remote network node store a plurality of the objects, and each of the plurality of objects has a unique object signature across the plurality of network nodes;
receive an acknowledgment from the remote network node; and
persist the first object, with the object signature for the first object, to the local object store and the remote object store.

6. The non-transitory computer readable medium of claim 5, wherein the machine readable instructions to persist the first object are executable by the processor to:
simultaneously persist the object signature of the first object to the local object store and the remote object store.

7. The non-transitory computer readable medium of claim 1, wherein the first object is a child object farthest from the root object.

8. The non-transitory computer readable medium of claim 1, wherein the machine readable instructions are executable by the processor to:
determine that the object record associated with the second object does not include an indication of the cryptographic function used to encode the object signature of the second object; and
in response to the determination that the object record does not include an indication of the cryptographic function used to encode the object signature of the second object, identify that the object signature of the second object was encoded according to the first cryptographic function.

9. The non-transitory computer readable medium of claim 1, wherein the determined cryptographic function is the second cryptographic function.

10. The non-transitory computer readable medium of claim 1, wherein the machine readable instructions are executable by the processor to:
update a reference count for the second object in the associated object record.

11. A system comprising:
a hardware processor;
an object store to store objects, each of the stored objects having an object signature determined based on a first cryptographic function, and wherein the objects stored in the object store exhibit a hierarchical relationship from a root object of the object store; and a non-transitory computer readable medium comprising instructions executable by the hardware processor to:
receive a second cryptographic function for the object store;
receive an input/output (I/O) request affecting a first object in the object store;
encode an object signature for the first object according to the second cryptographic function;
persist the affected first object, with the object signature for the first object encoded according to the second cryptographic function, to the object store with other objects in the object store identified by object signatures encoded according to the first cryptographic function;
receive another I/O request affecting a second object in the object store;
determine an object record associated with the second object;
determine, from a parent object of the second object, a cryptographic function used to encode an object signature of the second object affected by the another I/O request;
determine whether the object signature of the second object in the parent object matches an object signature of the second object in the determined object record; and
based on a determination that the object signature of the second object in the parent object matches the object signature of the second object in the determined object record, retrieve the second object.

12. The system of claim 11, wherein the processor is to execute the instructions to:
determine a remote network node storing the first object affected by the I/O request;
transmit a synchronization notification to the remote network node in a plurality of network nodes, wherein each of the plurality of network nodes stores objects having unique object signatures across the plurality of network nodes;
receive an acknowledgment from the remote network node; and
persist the first object with the object signature for the first object encoded according to the second cryptographic function simultaneously to the object store and an object store of the remote network node.

13. The system of claim 12, wherein the processor is to execute the instructions to:
determine a parent object of the first object;
modify contents of the parent object of the first object to include the object signature of the first object;
encode an object signature for the parent object of the first object using the second cryptographic function; and
persist the parent object of the first object with the encoded object signature for the parent object to the object store.

14. The system of claim 13, wherein the processor is to execute the instructions to:
determine whether the parent object of the first object is not the root object;
in response to a determination that the parent object of the first object is not the root object, determine a grandparent object of the first object;
modify contents of the grandparent object of the first object to include the encoded object signature of for the parent object of the first object;
encode an object signature for the modified grandparent object according to the second cryptographic function;
persist, to the object store, the modified grandparent object with the encoded object signature for the grandparent object;
process and persist objects between the modified grandparent object and the root object;
modify the root object with an object signature of a child object of the root object;
encode an object signature for the root object according to the second cryptographic function; and
persist the modified root object to the object store.

15. A method comprising:
receiving a second cryptographic function for an object store to store objects on a local network node, each of the stored objects having an object signature determined according to a first cryptographic function and unique across a plurality of network nodes, and wherein the objects stored in the object store exhibit a hierarchical relationship from a root object of the object store;
receiving an input/output (I/O) request to modify a first object in the object store on the local network node;
encoding an object signature for the modified first object according to the second cryptographic function;
persisting the modified first object, with the encoded object signature for the first object, to the object store on the local network node, with other objects in the object store identified by object signatures encoded according to the first cryptographic function;
receiving another I/O request affecting a second object in the object store;
determining an object record associated with the second object;
determining, from a parent object of the second object, a cryptographic function used to encode an object signature of the second object affected by the another I/O request;
determining whether the object signature of the second object in the parent object matches an object signature of the second object in the determined object record; and
based on a determination that the object signature of the second object in the parent object matches the object signature of the second object in the determined object record, retrieving the second object.

16. The method of claim 15, comprising:
transmitting a synchronization notification to a remote network node of the plurality of network nodes, wherein the remote network node also stores the first object to be modified by the I/O request; and
receiving an acknowledgment to the synchronization notification, wherein the modified first object with the object signature for the modified first object encoded according to the second cryptographic function is persisted simultaneously to the object store on the local network node and to an object store on the remote network node.

17. The method of claim 15, comprising:
determining a parent object of the modified first object;
encoding an object signature for the parent object of the first object using the second cryptographic function; and
persisting the parent object of the first object, with the encoded object signature for the parent object of the first object, to the object store of the local network node and an object store of a remote network node simultaneously.

18. The method of claim 15, comprising:

determining a parent object of the modified first object;

modifying contents of the parent object of the first object to include the object signature of the modified first object;

encoding an object signature for the modified parent object of the first object according to the second cryptographic function; and persisting, to the object store on the local network node, the parent object of the first object with the encoded object signature for the parent object of the first object.

19. The method of claim 18, comprising:

determining whether the parent object of the first object is not a root object;

determining a grandparent object of the first object in response to a determination that the parent object of the first object is not the root object;

modifying contents of the grandparent object of the first object to include the encoded object signature for the parent object of the first object;

encoding an object signature for the grandparent object of the first object according to the second cryptographic function;

persisting the grandparent object of the first object with the encoded object signature for the grandparent object of the first object to the object store on the local network node;

generate a new object signature for each object between the persisted grandparent object and the root object after modifying each object to include an object signature of a child object one at a time;

modifying the root object with an object signature of a child object of the root object;

generating a new object signature for the root object; and persisting the root object to the object store.

* * * * *